(12) United States Patent
Chen et al.

(10) Patent No.: US 9,036,920 B2
(45) Date of Patent: *May 19, 2015

(54) METHOD OF DETECTING FEATURE POINTS OF AN OBJECT IN A SYSTEM FOR MOTION DETECTION

(75) Inventors: Po-Lung Chen, Tainan County (TW); Chien-Chun Kuo, Tainan County (TW); Wen-Yang Wang, Kaohsiung (TW); Duan-Li Liao, Taichung (TW)

(73) Assignees: INDUSTRIAL TECHNOLOGY RESEARCH INSTITUTE (TW); CYWEE GROUP LTD. (TW)

( * ) Notice: Subject to any disclaimer, the term of this patent is extended or adjusted under 35 U.S.C. 154(b) by 943 days.

This patent is subject to a terminal disclaimer.

(21) Appl. No.: 12/901,339

(22) Filed: Oct. 8, 2010

(65) Prior Publication Data

US 2012/0087539 A1    Apr. 12, 2012

(51) Int. Cl.
    *G06K 9/46*    (2006.01)
    *G06K 9/50*    (2006.01)
    *G06K 9/00*    (2006.01)

(52) U.S. Cl.
    CPC ................... *G06K 9/00335* (2013.01)

(58) Field of Classification Search
    CPC .................................. G06K 9/00335
    USPC .......................... 382/103, 154, 173, 209, 218
    See application file for complete search history.

(56) References Cited

U.S. PATENT DOCUMENTS

| | | | | |
|---|---|---|---|---|
| 5,930,379 | A * | 7/1999 | Rehg et al. | 382/107 |
| 6,606,412 | B1 * | 8/2003 | Echigo et al. | 382/224 |
| 7,212,665 | B2 * | 5/2007 | Yang et al | 382/159 |
| 7,925,081 | B2 * | 4/2011 | Gupta et al. | 382/159 |
| 7,940,960 | B2 * | 5/2011 | Okada | 382/103 |
| 8,578,299 | B2 * | 11/2013 | Chen et al. | 715/848 |
| 2010/0215271 | A1 * | 8/2010 | Dariush et al. | 382/180 |
| 2012/0007975 | A1 * | 1/2012 | Lyons et al. | 348/77 |

* cited by examiner

*Primary Examiner* — Samir Ahmed
(74) *Attorney, Agent, or Firm* — Hershkovitz & Associates, PLLC; Abe Hershkovitz

(57) ABSTRACT

A method of detecting feature points of an object in a system for motion detection includes obtaining a first image of the object from a first camera and a second image of the object from a second camera, extracting a foreground image from each of the first image and the second image, based on an assumption that the foreground image is a T-pose image, segmenting the foreground image into a first set of sections, identifying a first set of feature points associated with the first set of sections, obtaining a T-pose image with a set of predetermined feature points, and determining whether the foreground image is a T-pose image by comparing the first set of feature points with the set of predetermined feature points.

20 Claims, 26 Drawing Sheets

METHOD OF DETECTING FEATURE POINTS OF AN OBJECT IN A SYSTEM FOR MOTION DETECTION

BACKGROUND OF THE INVENTION

The invention generally relates to motion capture and, more particularly, to a method of detecting feature points of an object of interest.

Three-dimensional (3D) motion capture techniques have been rapidly and increasingly developed in recent years in the visual arts industry such as computer animation and interactive video game. "Motion capture" may generally refer to the tracking and recording of the motion of an object of interest. In a typical motion capture session, the motion of an object or performer may be captured and translated to a computer-generated character or virtual role, which may act as the performer acts. Moreover, in an interactive video game, "motion" may refer to the movement of feature points such as the head and limbs of a performer. Detection of the 3D orientation such as the position and depth associated with the feature points of a performer may be a significant factor in determining the quality of such interactive video games. To provide smooth rendering of performer motion by means of a computer-generated character, it may be desirable to have a method of detecting the feature points of an object of interest so as to determine the motion of the object.

BRIEF SUMMARY OF THE INVENTION

Examples of the present invention may provide a method of detecting feature points of an object in a system for motion detection. The method comprises obtaining a first image of the object from a first camera and a second image of the object from a second camera, extracting a foreground image from each of the first image and the second image, based on an assumption that the foreground image is a T-pose image, segmenting the foreground image into a first set of sections, identifying a first set of feature points associated with the first set of sections, obtaining a T-pose image with a set of predetermined feature points, and determining whether the foreground image is a T-pose image by comparing the first set of feature points with the set of predetermined feature points.

Some examples of the present invention may also provide a method of detecting feature points of an object in a system for motion detection. The method comprises obtaining an image of the object from a camera, extracting a foreground image from the image, based on an assumption that the foreground image is a T-pose image, segmenting the foreground image into a first set of sections, identifying a first set of feature points associated with the first set of sections, comparing the first set of feature points with a set of predetermined feature points associated with a T-pose image, identifying a trunk portion and a shoulder portion in the foreground image, segmenting the foreground image into a second set of sections based on the trunk portion and the shoulder portion, and identifying a second set of feature points associated with the second sect of sections.

Additional features and advantages of the present invention will be set forth in portion in the description which follows, and in portion will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, examples are shown in the drawings. It should be understood, however, that the invention is not limited to the precise arrangements and instrumentalities shown in the examples.

In the drawings.

DETAILED DESCRIPTION OF THE INVENTION

Reference will now be made in detail to the present examples of the invention, examples of which are illustrated in the accompanying drawings. Wherever possible, the same reference numbers will be used throughout the drawings to refer to the same or like parts.

Figure 1:
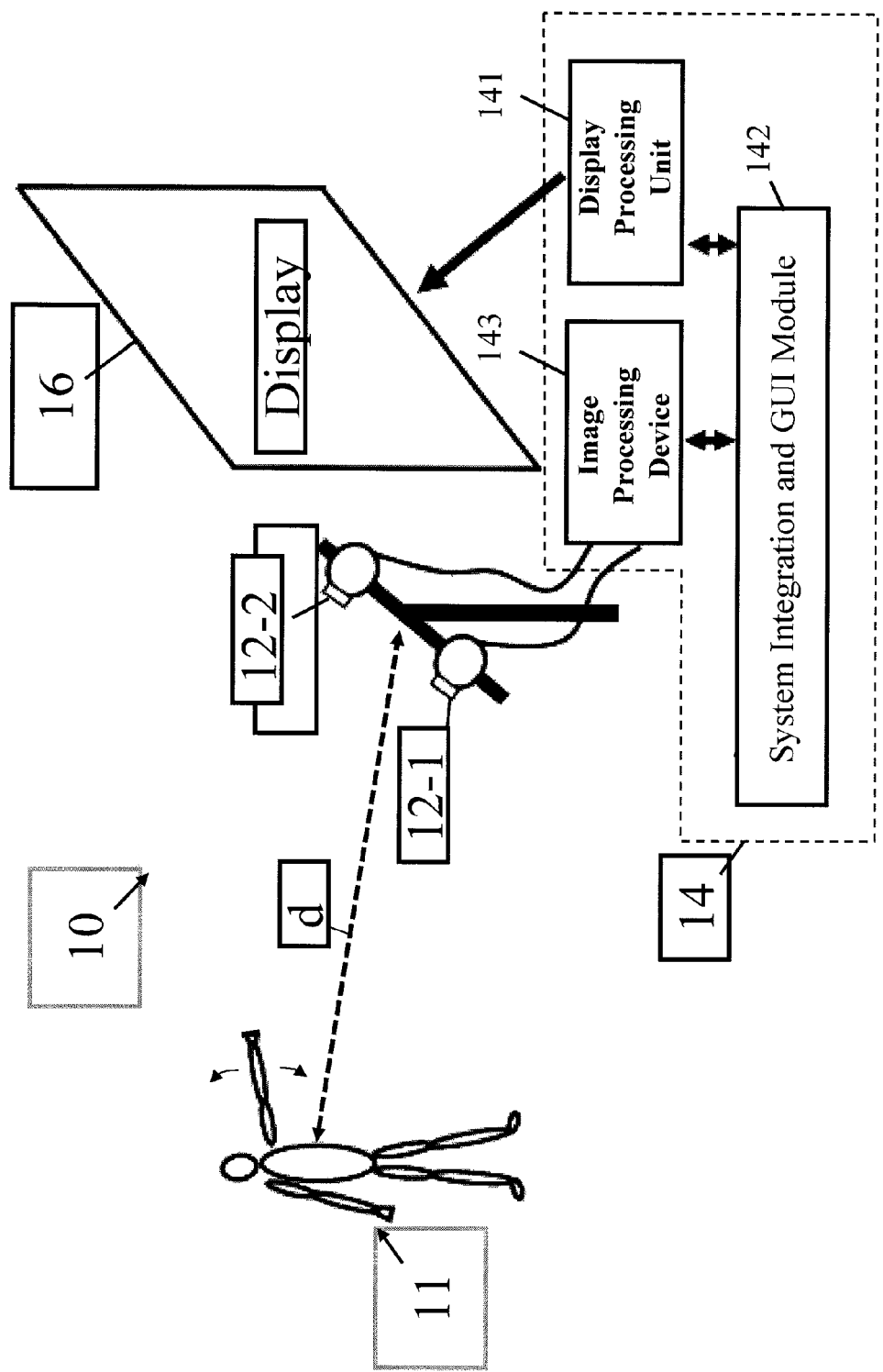
FIG. 1 is a schematic diagram of a system for motion detection in accordance with an example of the present invention.

FIG. 1 is a schematic diagram of a system 10 for motion detection in accordance with an example of the present invention. Referring to FIG. 1, the system 10 may include a first three-dimensional (3D) image capture device 12-1, a second 3D image capture device 12-2, a computing device 14 and a display device 16. The first and second image capture devices 12-1 and 12-2, for example, cameras, may be separated from each other by a suitable distance and positioned at a same elevation to facilitate acquiring an image of an object of interest 11 positioned in front of the first and second cameras 12-1 and 12-2 by a distance "d". The object of interest 11 may include but is not limited to a performer such as a human or an animal.

The computing device 14, which may be a personal computer or a notebook computer, may include a display processing unit 141, a graphical user interface (GUI) module 142 and an image processing device 143. A first image and a second image taken by the first and second cameras 12-1 and 12-2, respectively, may be sent to the image processing device 143, which may be configured to acquire information on the position and depth of feature points in each of the first and second image and, based on the information, determine the motion or gesture of the object 11 of interest. The GUI module 142 may be configured to drive a virtual role based on the motion determined by the image processing device 143.

Figure 2A:
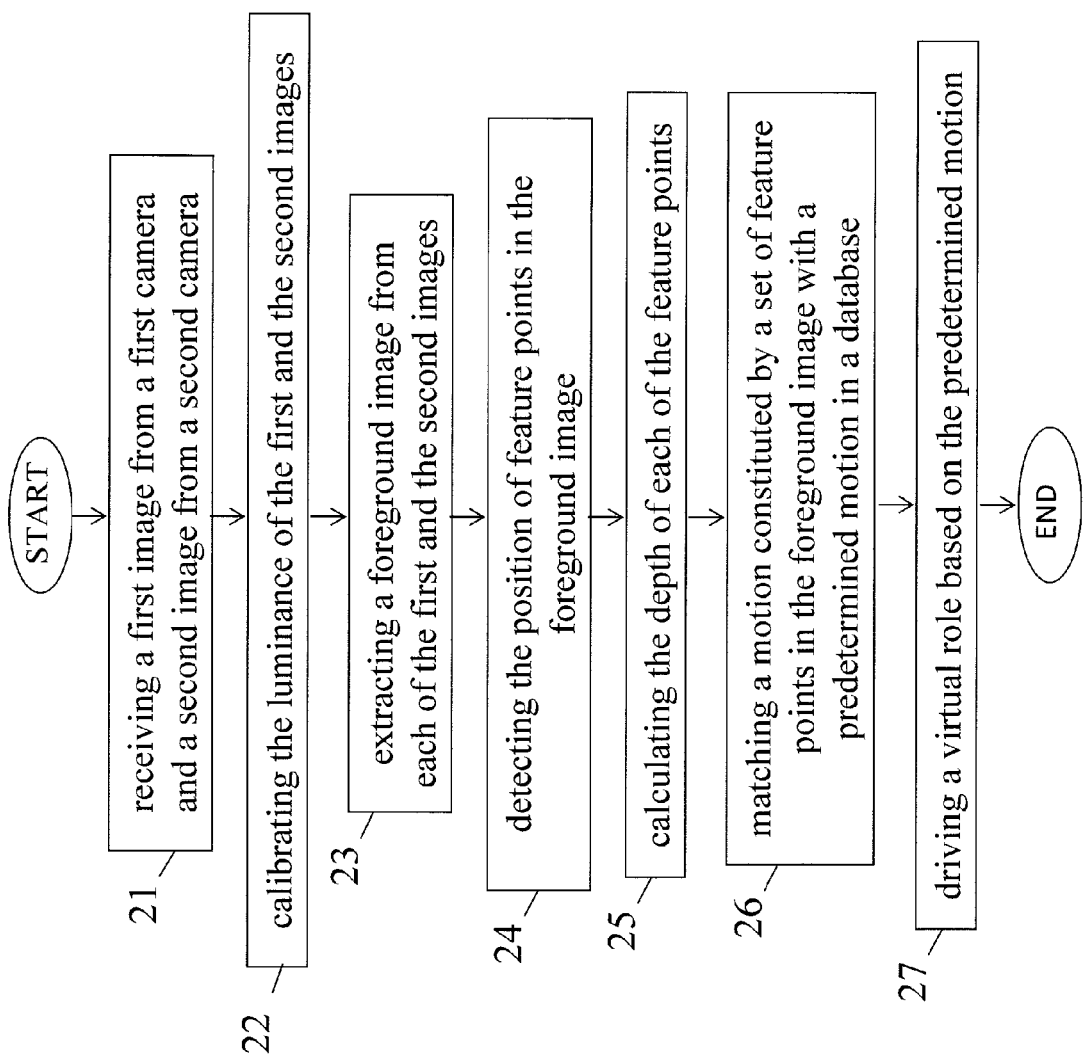
FIG. 2A is a flow diagram illustrating a method of motion detection in accordance with an example of the present invention.

FIG. 2A is a flow diagram illustrating a method of motion detection in accordance with an example of the present invention. Referring to FIG. 2A, at step 21, a first image and a second image respectively captured by a first camera and a second camera such as the cameras 12-1 and 12-2 are received.

The first and second images from the first and second cameras 12-1 and 12-2 may have different luminance levels due to various factors such as view angles, view areas and electronic characteristics of the cameras. To facilitate subsequent calculation and comparison associated with feature points, at step 22, the luminance or grayscale of the first and second images may be calibrated. In one example according to the present invention, a histogram method may be used for the luminance calibration. Specifically, histograms of pixel grayscale levels in the first and second images may be compared with each other so that the pixel grayscale may be normalized. As a result, the grayscale level of at least one of the first or second image may be increased or decreased so as to maximize the correlation of the pixel grayscale levels in the first and second images.

Figure 3:
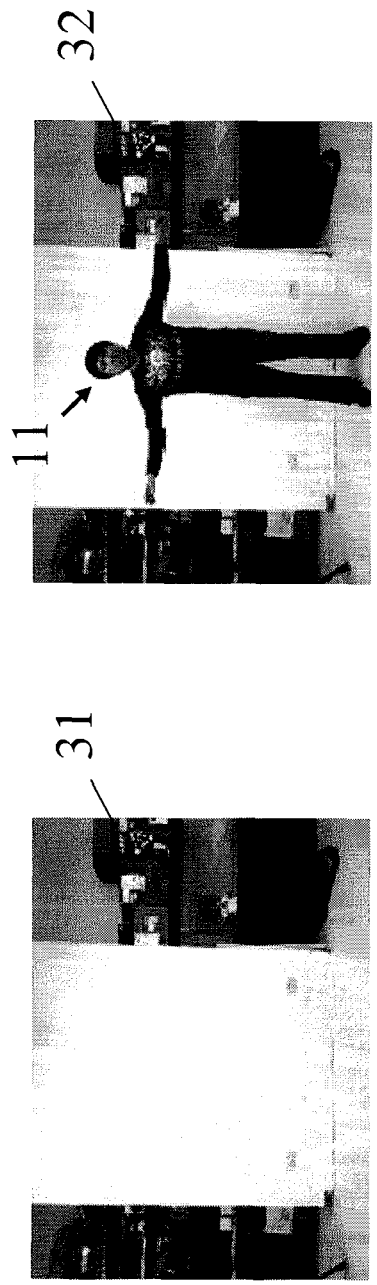
FIG. 3 is a set of photo diagrams illustrating an exemplary method of foreground extraction.
Figure 3:
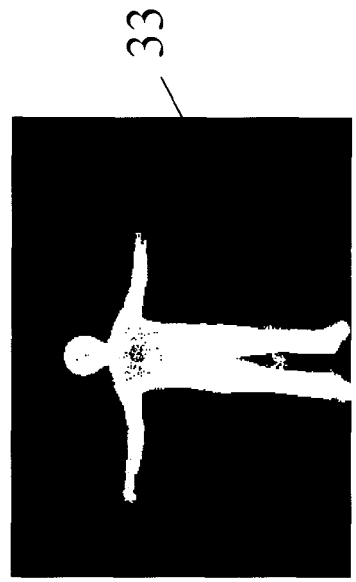

At step 23, a background image of each of the first and second images may be filtered, resulting in a foreground image. FIG. 3 is a set of photo diagrams illustrating an exemplary method of foreground extraction. Referring to FIG. 3, it may be assumed that a background 31 is simple and subject to a constant light. Accordingly, calculation of the difference between a current image 32 and the background image 31 may result in a foreground image 33. The foreground image 33 may be extracted by the following equation:

$$D(x, y) = \begin{cases} |I(x, y) - B(x, y)|, & \text{if } |I(x, y) - B(x, y)| \geq T \\ 0, & \text{otherwise} \end{cases} \quad (1)$$

where $D(x, y)$ represents the luminance of a pixel with coordinates $(x, y)$ in a foreground image, $I(x, y)$ represents the luminance of a pixel $(x, y)$ in the current image, $B(x, y)$ represents the luminance of a pixel with coordinates $(x, y)$ in a background image and T represents a predetermined threshold. $D(x, y)$ may be further classified to generate a foreground image of two grayscale levels. For example, in the present case, the foreground image 33 includes an object 11 of interest in white and a background in black.

However, due to environmental factors, the light may change in hue and intensity such that the background image 31 is not subject to a constant light. It may therefore be desirable to update a background image at a proper time. An exemplary approach to update the background image may be achieved by averaging several background images in pixel grayscale value. Another exemplary approach may be achieved by forming a new background image of median pixel grayscale values based on several background images. Still another exemplary approach uses a "running average" to update a background image in an equation below:

$$B_{i+1} = \alpha \times I_i + (1 - \alpha) \times B_i, \quad (2)$$

where $I_i$ represents a current image, $B_i$ is a current background image and $\alpha$ is a learning curve with a typical value of 0.05.

Figure 2B:
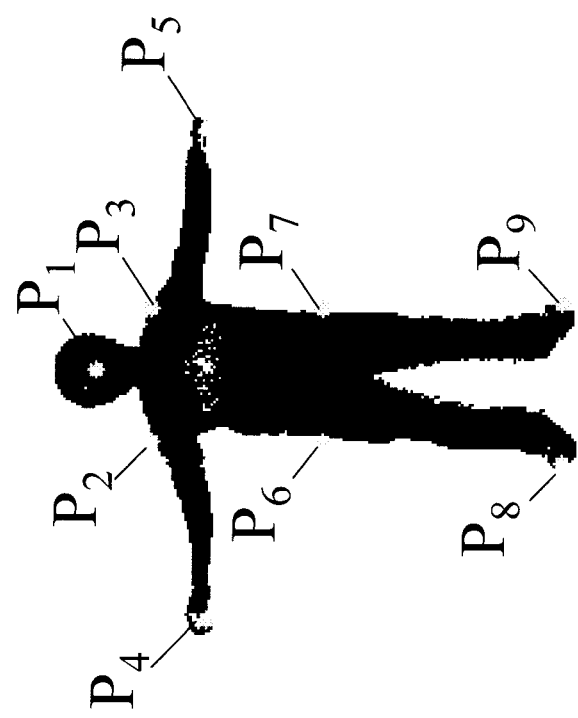
FIG. 2B is a schematic diagram of feature points in a foreground image in accordance with an example of the present invention.

Referring back to FIG. 2A, after the foreground image of each of the first and second images is extracted at step 23 and, optionally, a background image associated with the foreground image is updated, at step 24 the position of each of feature points associated with an object of interest in the foreground image may be detected. The "position" may refer to a two-dimension (2D) coordinates of a pixel, denoted as pixel $(x, y)$. Moreover, a feature point may refer to a point in a foreground image that may preferably describe the feature of a motion at a portion of the object of interest when doing an action. FIG. 2B is a schematic diagram of feature points in a foreground image in accordance with an example of the present invention. Referring to FIG. 2B, a set of feature points $P_1$ to $P_9$ may be located in the foreground image of the object of interest. Specifically, the feature point $P_1$ may refer to a head portion, $P_2$ and $P_3$ the shoulders, $P_4$ and $P_5$ the palms, $P_6$ and $P_7$ the waist portions and $P_8$ and $P_9$ the feet of the object of interest.

In the present example, nine feature points $P_1$ to $P_9$ are used to describe the motion or gesture of an object. In other examples, however, the number of feature points may be smaller or greater than nine. For example, a smaller set of feature points may be used in order for a faster calculation. Furthermore, a larger set of feature points with additional points associated with the knees or elbows of an object may be used in order for smoother motion rendering.

Referring back to FIG. 2A, to identify the feature points at step 24, several sub-steps may be taken, which will be discussed in later paragraphs by reference to FIG. 4 together with FIGS. 5A to 5F and to FIGS. 6A to 6H.

Next, the depth of each of the feature points may be calculated at step 25, which will be discussed in later paragraphs by reference to FIG. 7 and FIGS. 8A to 8D. When the depth is determined, the 3D coordinates of each feature point may be determined, denoted as pixel $(x, y, z)$, where "z" represents the z-axis coordinate.

Based on the 3D information on a set of feature points in the foreground image, a motion of the object of interest may be constituted. At step 26, the motion constituted by the set of feature points in the foreground image may be compared with predetermined motions in a database until a match is located. The predetermined motions and the way to identify a match will be discussed by reference to FIGS. 10A to 10C.

Subsequently, at step 27, a virtual role or computer-generated character may be driven to do the same motion as the matched predetermined motion.

Figure 4:
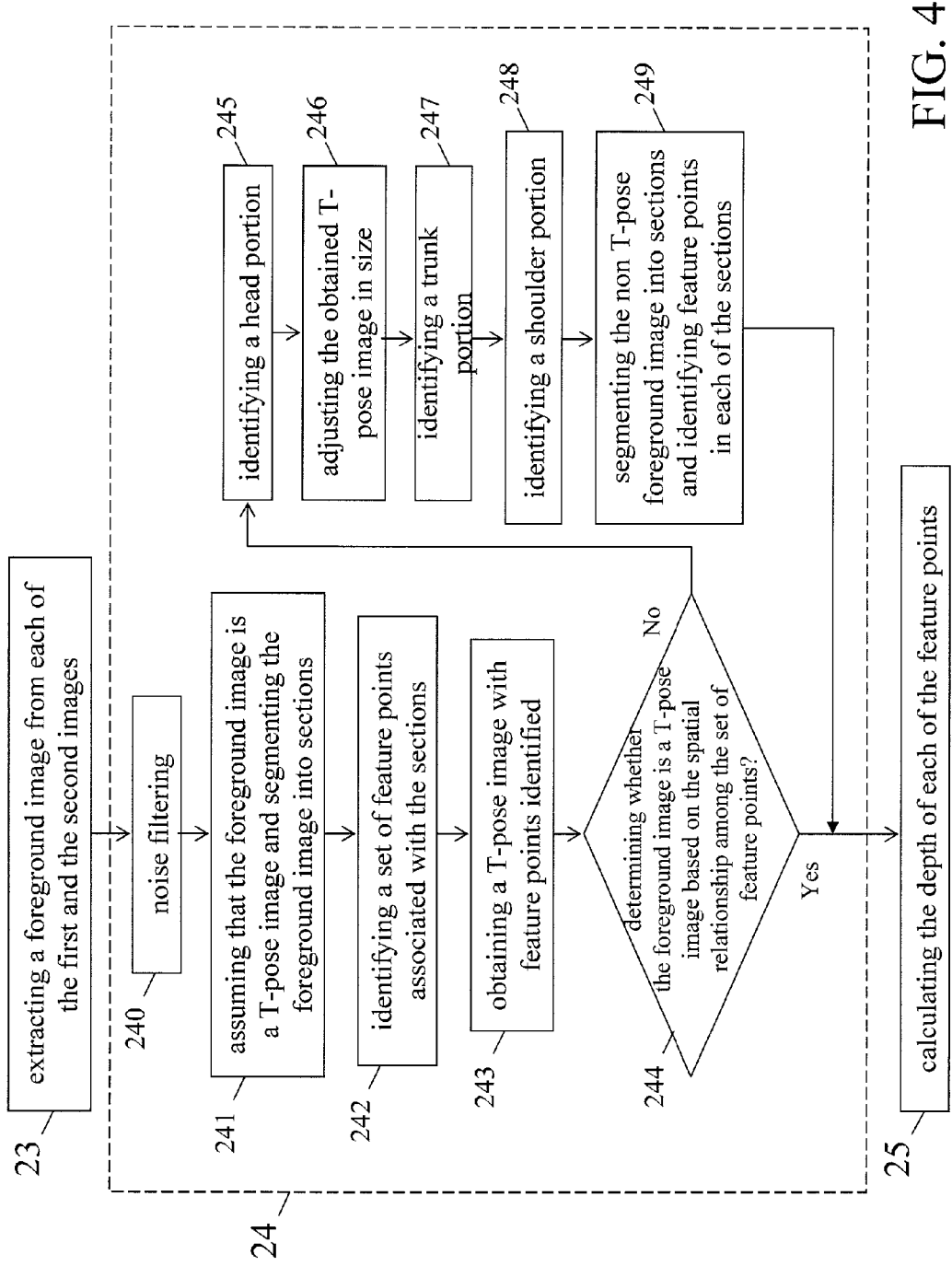
FIG. 4 is a flow diagram illustrating a method of detecting feature points in accordance with an example of the present invention.

FIG. 4 is a flow diagram illustrating a method of detecting feature points in accordance with an example of the present invention. Referring to FIG. 4, at step 240, the foreground image resulting from step 23 in FIG. 2A may be filtered to remove noise. In one example, a "labeling" method may be used to filter the foreground image. As previously discussed, the foreground image may include an object portion with a first value (for example, "1" and thus is labeled) and a background portion with a second value (for example, "0" and thus is not labeled). The labeling method may include the following steps:

(1) scanning the foreground image in a fashion from left to right and top to down, pixel by pixel; and (2) assigning a value to each of the pixels according to a rule as follows: if any of the eight neighbor pixels associated with a pixel at a center of a 3×3 pixel block is labeled, assign the pixel at issue with the same value as the neighbor pixel, or assign the pixel at issue with a new number; and if more than one neighbor pixels are labeled, assign the pixel at issue together with the labeled neighbor pixels with the smallest value in the labeled neighbor pixels.

By applying the labeling method, significant portions that may represent parts of the object of interest in the foreground image may be recognized and noise in the foreground image may be removed, which in turn may facilitate detection of feature points and calculation of the depth of each of the feature points.

Next, at step 241, it may be assumed that the foreground image includes the image of an object of interest positioned in a T-pose. A T-pose may refer to a pose that the object full extends his/her arms such that the arms and trunk form a "T-like" posture, as the posture of the object 11 in the foreground image 32 illustrated in FIG. 3. Next, based on the assumption, the foreground image may be segmented into a number of sections each including at least one feature point. Segmentation of the foreground image may facilitate the search for feature points at step 242.

Figure 5B:
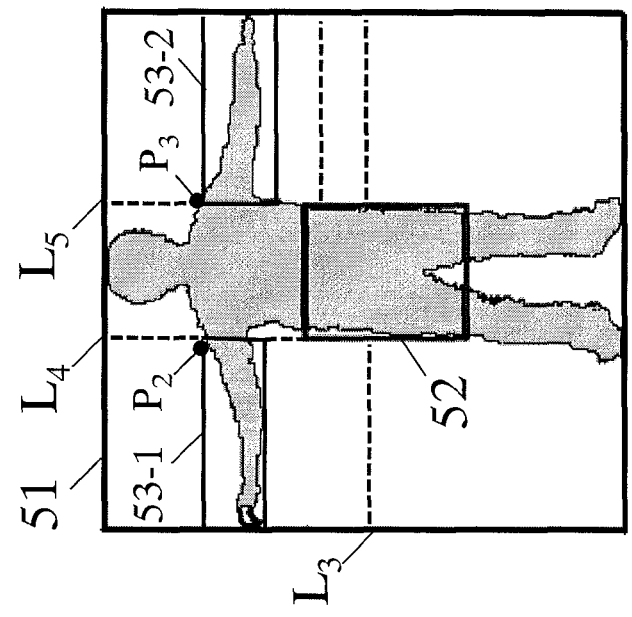
FIGS. 5A to 5F are photo diagrams illustrating a method of detecting feature points in a T-pose object in accordance with an example of the present invention.
Figure 5A:
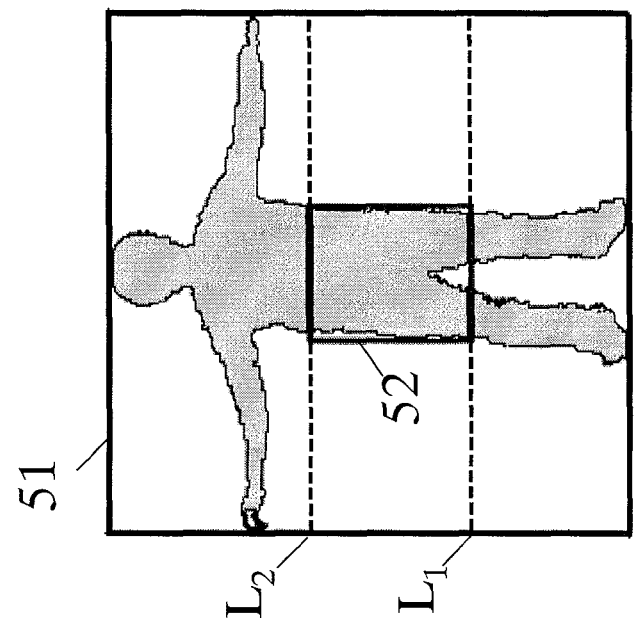

FIGS. 5A to 5F are photo diagrams illustrating a method of detecting feature points in a T-pose object in accordance with an example of the present invention. Referring to FIG. 5A, a first box 51 may be identified by enveloping the object in the foreground image (hereinafter the "foreground object") in a minimum rectangular block. The first box 51 thus includes the set of feature points $P_1$ to $P_9$. Being a T-pose image, the head portion may be higher than other portions of the object in the image and thus may be easily identified. Next, a second box 52 may be identified by substantially averagely dividing the foreground image into three parts by a pair of lines $L_1$ and $L_2$ extending in parallel with each other across the trunk portion of the foreground image and enveloping the foreground image between the lines $L_1$ and $L_2$ in a minimum rectangular block.

Referring to FIG. 5B, a pair of third boxes 53-1 and 53-2 may be identified by dividing the first box 51 in halves by a line $L_3$ extending in parallel with $L_1$ and $L_2$; extending lines $L_4$ and $L_5$ toward the head portion from sides of the second box 52 in a direction orthogonal to $L_3$; enveloping the foreground image in a minimum rectangular block in a region defined by the first box 51 and lines $L_3$ and $L_4$ free from the second box 52, resulting in the first third box 53-1; and enveloping the foreground image in a minimum rectangular block in a region defined by the first box 51 and lines $L_3$ and $L_5$ free from the second box 52, resulting in the second third box 53-2. The first third box 53-1 may include the feature points associated with the right palm and right shoulder of the foreground object. Likewise, the second third box 53-2 may include the feature points associated with the left palm and the left shoulder of the foreground object. In one example, the point on the border of the first third box 53-1 near the head portion may be recognized as the feature point $P_2$, and the point on the border of the second third box 53-2 near the head portion may be recognized as the feature point $P_3$.

Figure 5D:
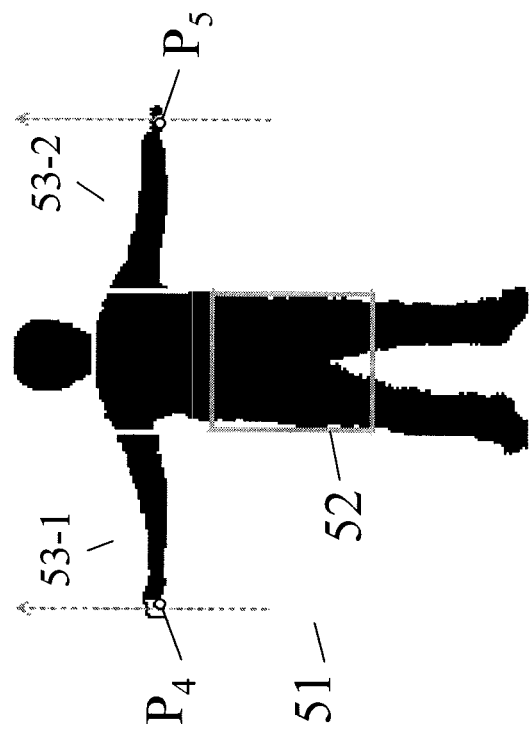
Figure 5C:
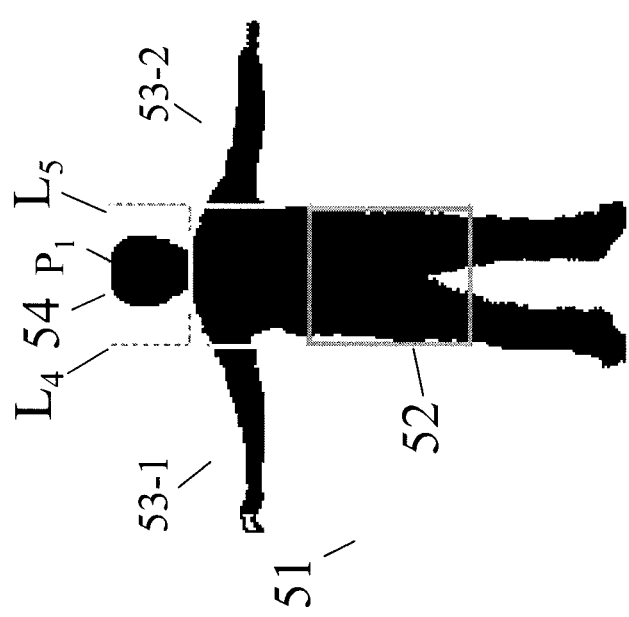

Referring to FIG. 5C, a fourth box 54 associated with the head portion may be identified by enveloping the foreground object in a minimum block in a region between $L_4$ and $L_5$ above the third boxes 53-1 and 53-2. Furthermore, the geometric center of the fourth box 54 may be recognized as the feature point $P_1$. In one example, the fourth box 54 may serve as a template to facilitate the search for a head portion of a foreground object. Moreover, if the assumed T-pose foreground image is indeed a T-pose image (which will be discussed at step 244 in FIG. 4), the fourth box 54 may be updated when a new fourth box in a subsequent foreground image is identified. In another example, a portion of the fourth box 54, which includes at least an upper half of the fourth box 54 and is similar to a box 600 illustrated in FIG. 6A, may serve as a template and, likewise, may be updated when a T-pose image is identified.

Referring to FIG. 5D, the feature points $P_4$ and $P_5$ associated with the right and left palms may be identified in the first and third boxes 53-1 and 53-2, respectively. For example, a point in the first third box 53-1 that is distant from the feature point $P_2$ and has a height close to the feature point $P_2$ may be recognized as the feature point $P_4$. Similarly, a point in the second third box 53-2 that is distant from the feature point $P_3$ and has a height close to the feature point $P_3$ may be recognized as the feature point $P_5$.

Figure 5F:
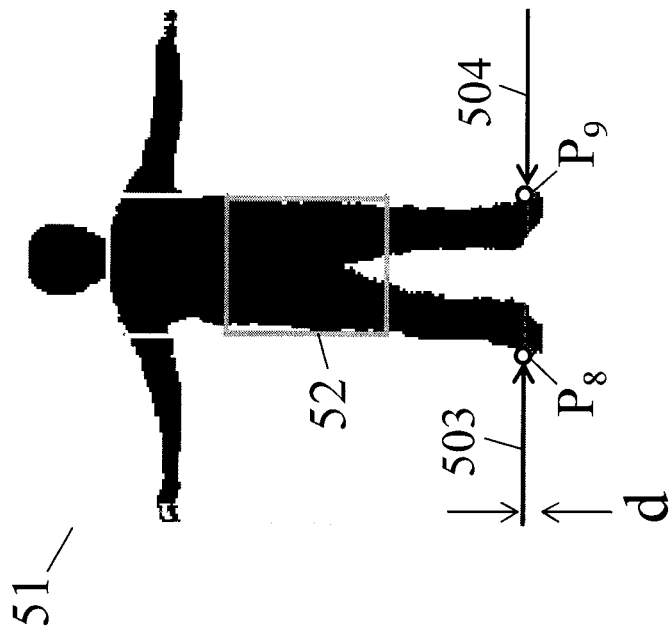
Figure 5E:
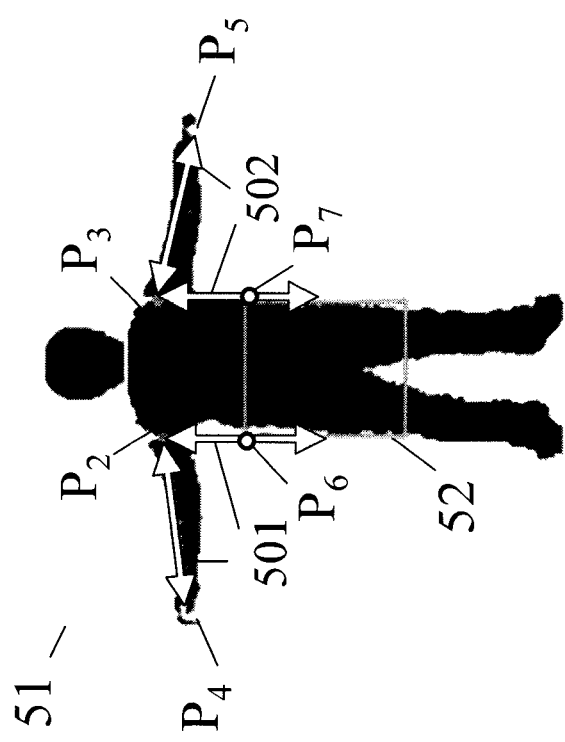

Referring to FIG. 5E, a line 501 extending between $P_2$ and $P_4$ may be determined. By pivoting the line 501 on $P_2$ toward the second box 52, a point in the foreground image in the second box 52 apart from $P_2$ by a distance substantially equal to half of the length of the line 501 may be recognized as the feature point $P_6$. Moreover, a line 502 extending between $P_3$ and $P_5$ may be determined. Similarly, by pivoting the line 502 on $P_3$ toward the second box 52, a point in the foreground image in the second box 52 apart from $P_3$ by a distance substantially equal to half of the length of the line 502 may be recognized as the feature point $P_7$. In one example, one of the lines 501 and 502 with a longer length may be used to identify the feature points $P_6$ and $P_7$.

Referring to FIG. 5F, the feature point $P_8$ may be identified by scanning the foreground image from one side of the first box 51 toward an opposite side and from bottom to top until the foreground object is reached. Similarly, the feature point $P_9$ may be identified by scanning the foreground image from the opposite side of the first box 51 toward the one side and from bottom to top until the foreground object is reached. In the present example, to avoid mistaking a shadow near the feet as a feature point, the scanning may be started at a predetermined shift "d" above the bottom of the first box 51.

The feature points identified at step 242 by the method illustrated in FIGS. 5A to 5F may exhibit a spatial relationship. Referring back to FIG. 4, a T-pose image with feature points identified may be obtained at step 243 from, for example, a database. To facilitate the search for feature points in the non T-pose image, in one example, the obtained T-pose image may include an object similar in the type of build to the object of interest. In another example, a T-pose image of the object of interest may have been taken in advance by cameras 12-1 and 12-2 and stored in the database. Based on the spatial relationship, it may be determined at step 244 whether the assumed T-pose foreground image is indeed a T-pose image by comparing the feature points associated with the assumed T-pose foreground image with those of the obtained T-pose image. Specifically, the comparison may include comparing the relative position of the feature points of the assumed T-pose image with the relative position of the set of predetermined feature points. For example, if the feature points are distributed as those illustrated in FIG. 2B, the foreground image may be recognized as a T-pose image. If, however, any two of the feature points are not spaced apart from each other by a predetermined distance, the foreground image is not recognized as a T-pose image or is recognized as a non T-pose image.

If at step 244 it is determined that the foreground image is a T-pose image, then at step 25 the depth of each of the feature points identified at step 242 may be calculated.

Figure 6B:
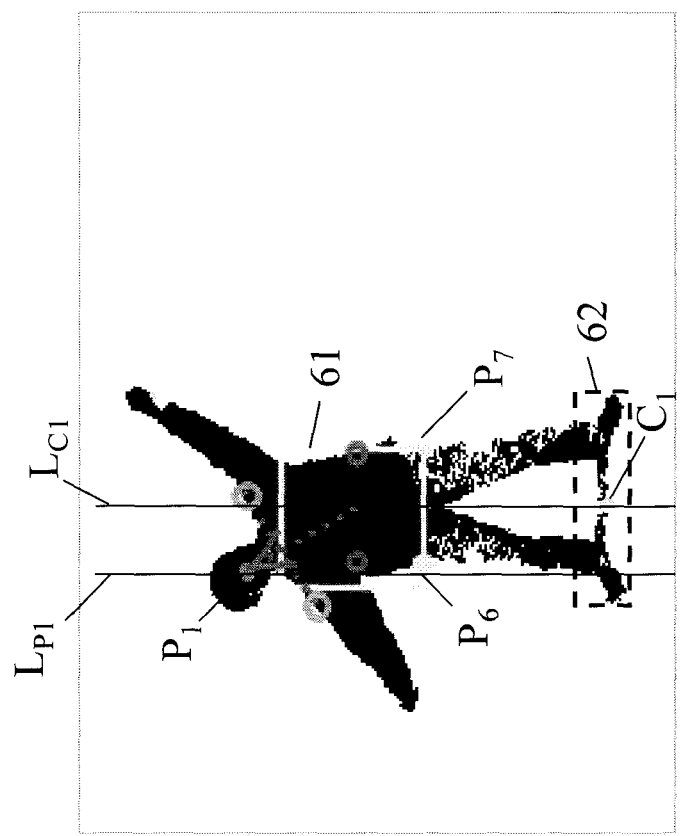
FIGS. 6A to 6H are diagrams illustrating a method of detecting feature points in a non T-pose object in accordance with an example of the present invention.
Figure 6A:
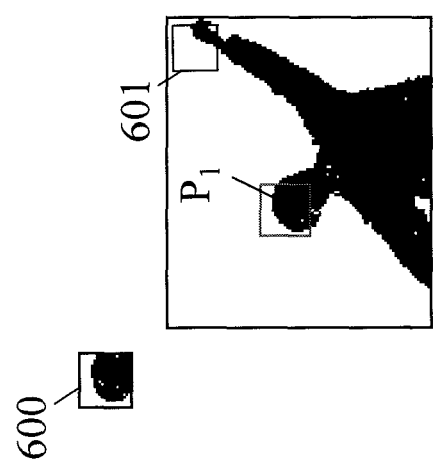

If at step 244 it is determined that the foreground image is a non T-pose image, a head portion of the non T-pose foreground object is to be identified at step 245. FIGS. 6A to 6H are diagrams illustrating a method of detecting feature points in a non T-pose object in accordance with an example of the present invention. Referring to FIG. 6A, based on the assumption that the head portion is higher than other portions of the foreground object, a check box 601 of a predetermined size may be used to check whether the highest portion of the foreground object in the check box 601 reaches a predetermined ratio in terms of area. The "highest portion" may mean a portion of the foreground image whose y-axis coordinates are greater than those of other portions of the foreground image, given the origin at the left lowest point of the image. If confirmative, the foreground object in the check box 601 may be recognized as the head portion. In the present example, however, the highest portion is the left palm, which occupies approximately 15% to 20% of the check box 601 and thus is smaller than a predetermined ratio, for example, 60% to 70%.

If it is determined that the foreground object in the check box 601 is not the head portion, a head template 600 may be used. The head template 600, as previously discussed, may be updated after a head portion in a T-pose foreground image is identified and may initially include a semicircle. In one example, a block matching method may be used to identify a head portion based on the head template 600. When the head portion is identified, the feature point $P_1$ may be identified.

The size of the foreground image may be affected by the distance between the object and the cameras. It may be desirable to adjust the size of the obtained T-pose image at step 246 so as to facilitate subsequent processing. In one example, the obtained T-pose image may be enlarged or reduced based on the positions of shoulder and waist, i.e., $P_2$, $P_3$, $P_6$ and $P_7$, of the obtained T-pose foreground object.

Next, at step 247, a trunk portion 61 of the foreground object may be identified by sub-steps below. Firstly, the size of the trunk portion 61 may be determined by comparing to that of the obtained T-pose object after the obtained T-pose image is adjusted. Secondly, referring to FIG. 6B, a feet portion 62 may be identified by enveloping the feet of the foreground object in a minimum rectangular box. Accordingly, the center of the trunk portion 61 may be determined by vertical lines $L_{P1}$ that passes $P_1$ and $L_{C1}$ that passes the center $C_1$ of the feet portion 62 in an equation as follows.

$$X_t = \begin{cases} \frac{1}{4}X_h + \frac{3}{4}X_f, & \text{if } X_f > T_b \\ \frac{3}{4}X_h + \frac{1}{4}X_f, & \text{otherwize} \end{cases} \quad (3)$$

wherein $X_t$ is the x coordinate of the trunk center, $X_h$ is the x coordinate of $P_1$, $X_f$ is the x coordinate of the center $C_1$ of the feet portion 62 and $T_b$ is a predetermined threshold. Moreover, the y coordinate, $Y_t$, of the trunk center may be the same as that in the T-pose. Consequently, the center as well as the size of the trunk portion 61 is determined, thereby identifying the position of the trunk portion 61. Furthermore, points in the trunk portion 61 that located nearest to $P_6$ and $P_7$ of the obtained T-pose object may be recognized as $P_6$ and $P_7$ of the non T-pose foreground object.

Referring back to FIG. 4, after the trunk portion 61 is identified, a shoulder portion may be identified at step 248. Referring to FIG. 6C, the feature points $P_2$ and $P_3$ associated with the shoulder portion may be determined by the following sub-steps: identifying a trunk line $L_{61}$ extending from a center of the trunk portion 61 toward $P_1$, identifying a first point on $L_{61}$ apart from $P_1$ by a first predetermined distance, identifying a first line passing the first point on $L_{61}$ that is orthogonal to $L_{61}$, and identifying a pair of second points on the first line orthogonal to $L_{61}$ that are apart from the first point on $L_{61}$ by a second predetermined distance. In one example, the trunk line $L_{61}$ may start from a point located at half of the height of the trunk portion 61. The first and the second predetermined distances, regarding the position of the center of shoulders and the length of shoulders, respectively, may be obtained from the obtained T-pose image. Consequently, the pair of second points may be recognized as $P_2$ and $P_3$.

Figure 6D:
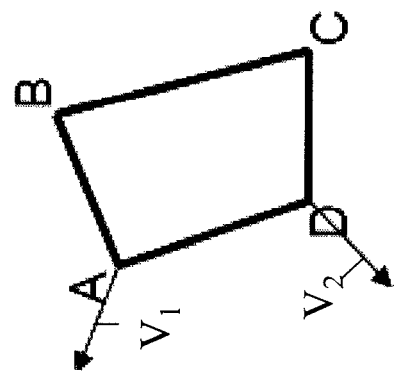
Figure 6C:
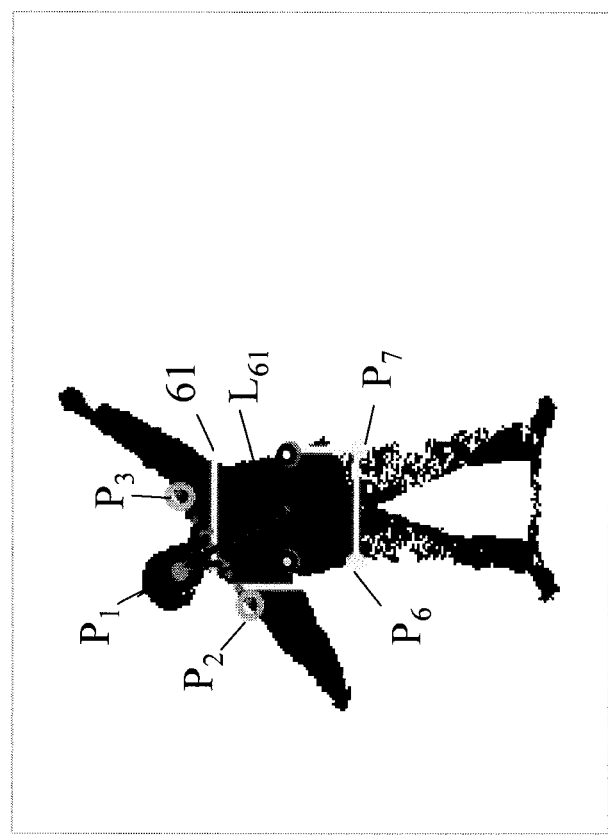

Referring to FIG. 6D, points A, B, C and D represent $P_2$, $P_3$, $P_7$ and $P_6$, respectively. The rectangle ABCD may form a trunk of the non T-pose foreground object. A first vector $V_1$ to separate the right hand from the head, and a second vector $V_2$ to separate the right hand from the right leg may be defined as follows.

$$\vec{v}_1 = -\frac{(\hat{v}_{AB} + \hat{v}_{AD})}{|(\hat{v}_{AB} + \hat{v}_{AD})|} \quad (4)$$

$$\vec{v}_2 = -\frac{(\hat{v}_{DA} + \hat{v}_{DC})}{|(\hat{v}_{DA} + \hat{v}_{DC})|} \quad (5)$$

Furthermore, a vector $V_3$ to separate the head from the left hand and a vector $V_4$ to separate the left hand from the left leg may be defined as follows.

$$\vec{v}_3 = -\frac{(\hat{v}_{BA} + \hat{v}_{BC})}{|(\hat{v}_{BA} + \hat{v}_{BC})|} \quad (6)$$

$$\vec{v}_4 = -\frac{(\hat{v}_{CB} + \hat{v}_{CD})}{|(\hat{v}_{CB} + \hat{v}_{CD})|} \quad (7)$$

Figure 6E:
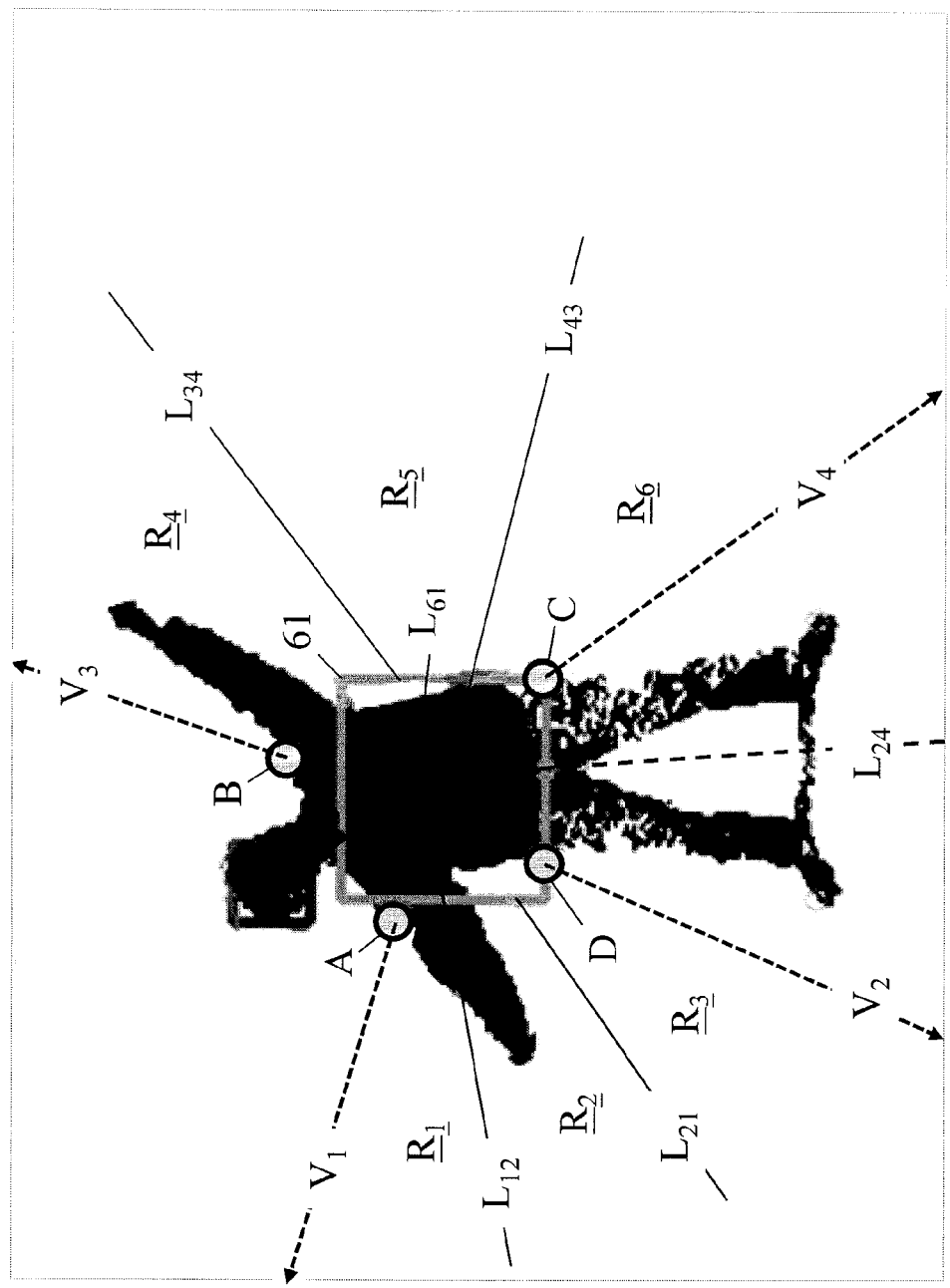

Referring back to FIG. 4, after the feature points $P_1$, $P_2$, $P_3$, $P_6$ and $P_7$ are identified, the non T-pose foreground object may be segmented into sections at step 249 so as to identify feature points $P_4$, $P_5$, $P_8$ and $P_9$. Referring to FIG. 6E, after the vectors $V_1$ to $V_4$ are defined on the basis of the points A, B, C and D, lines $L_{12}$ and $L_{21}$ to substantially divide a region between vectors $V_1$ and $V_2$ into three parts $R_1$, $R_2$ and $R_3$ and lines $L_{34}$ and $L_{43}$ to substantially divide a region between vectors $V_3$ and $V_4$ into three parts $R_4$, $R_5$ and $R_6$ may be identified. Similarly, a line $L_{24}$ to substantially divide a region between vectors $V_2$ and $V_4$ into two parts may be identified.

Figure 6F:
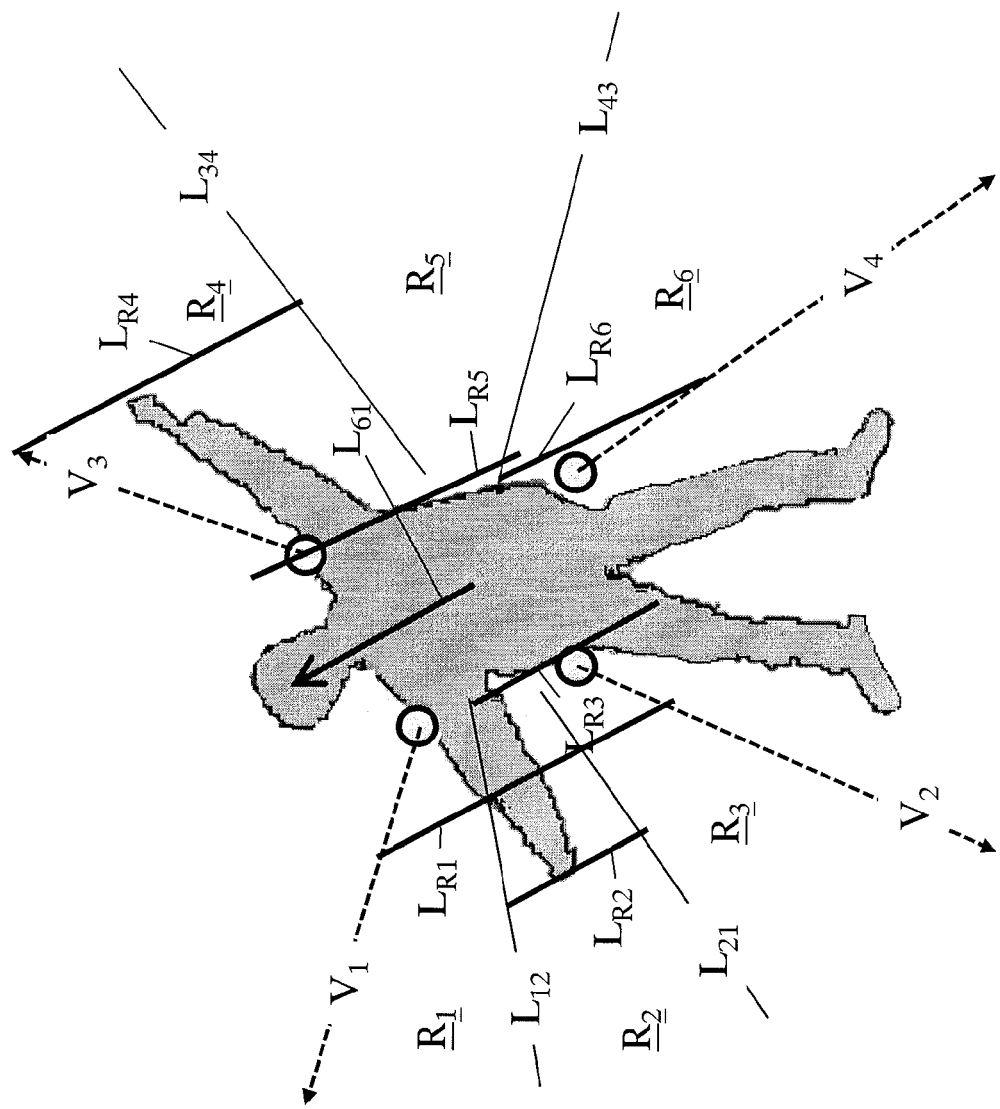

Referring to FIG. 6F, a line $L_{R1}$ extending in parallel with the trunk line $L_{61}$ and passing a point in the foreground object in the region $R_1$ that is located farthest to the trunk center may be identified. Moreover, a line $L_{R2}$ extending in parallel with the trunk line $L_{61}$ and passing a point in the foreground object in the region $R_2$ that is located farthest to the trunk center may be identified. Similarly, a line $L_{R3}$ extending in parallel with the trunk line $L_{61}$ and passing a point in the foreground object in the region $R_3$ that is located farthest to the trunk center may also be identified.

Likewise, a line $L_{R4}$ extending in parallel with the trunk line $L_{61}$ and passing a point in the foreground object in the region $R_4$ that is located farthest to the trunk center may be identified. Moreover, a line $L_{R5}$ extending in parallel with the trunk line $L_{61}$ and passing a point in the foreground object in the region $R_5$ that is located farthest to the trunk center may be identified. Similarly, a line $L_{R6}$ extending in parallel with the trunk line $L_{61}$ and passing a point in the foreground object in the region $R_6$ that is located farthest to the trunk center may also be identified.

Figure 6G:
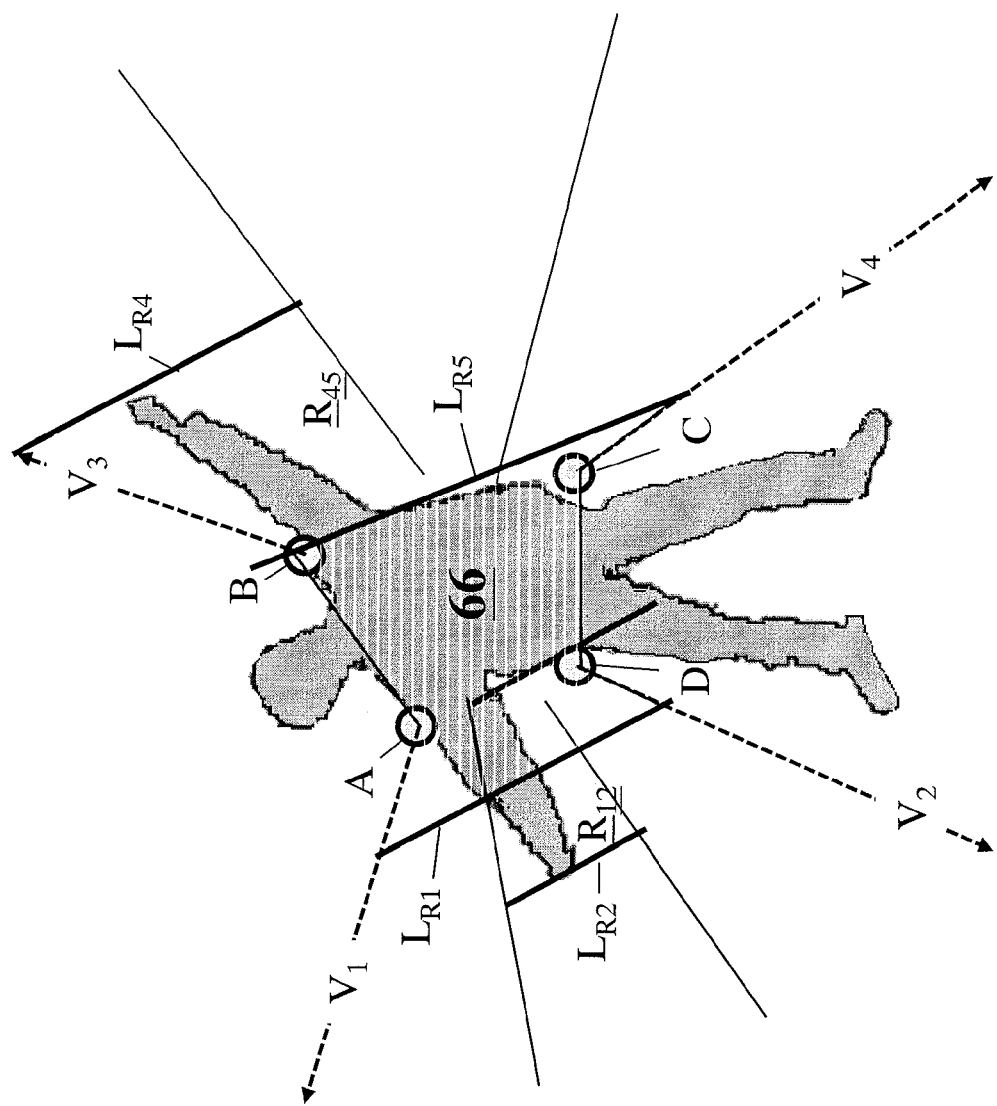
Figure 6H:
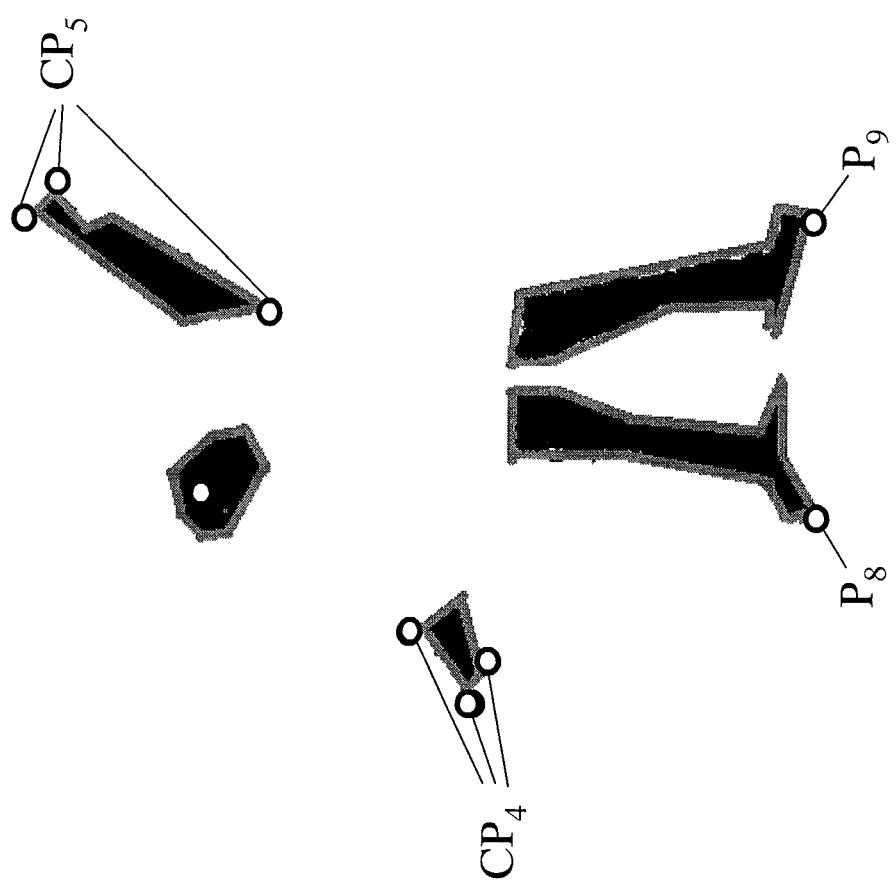

Referring to FIG. 6G, the farthest point in the region between the vectors $V_1$ and $V_2$ may be recognized as the right hand portion, which is located in a region $R_{12}$ in the region $R_2$ between $L_{R1}$ and $L_{R2}$. Similarly, the farthest point in the region between the vectors $V_3$ and $V_4$ may be recognized as the left hand portion, which is located in a region $R_{45}$ in the region $R_4$ between $L_{R4}$ and $L_{R5}$. The region between $L_{R1}$ and $L_{R5}$ and the trunk ABCD form a region 66. The region 66 does not include the required feature points $P_4$, $P_5$, $P_8$ and $P_9$ and may be removed, resulting in sections illustrated in FIG. 6H. Referring to FIG. 6H, a point in the right hand portion that is located farthest to the trunk center may be recognized as $P_4$. Moreover, a point in the left hand portion that is located farthest to the trunk center may be recognized as $P_5$. Also referring to FIG. 6E, likewise, a point in the foreground object in a region between $V_2$ and $L_{24}$ that is located farthest to the trunk center may be recognized as $P_8$. Moreover, a point in the foreground object in a region between $V_4$ and $L_{24}$ that is located farthest to the trunk center may be recognized as $P_9$.

To avoid the ends of limbs to be removed in FIG. 6G, turning points on the border of each of the sections may serve as candidates for a feature point. A turning point may refer to a point where abrupt change in direction of a border line may occur. Referring to FIG. 6H, the right hand portion may include three candidates $CP_4$ for the feature point $P_4$, and the left hand portion may include another three candidates $CP_5$ for the feature point $P_5$.

In a computer vision system, the "depth" of an object may refer to the distance between the object and a camera, for example, the distance "d" illustrated in FIG. 1. A feature point in a 2D image inherently has 2D coordinates. However, the depth of an object may affect the position of a feature point in the first and second images respectively taken by the first and second cameras 12-1 and 12-2. For more smooth and natural 3D motion rendering, the "depth" of a feature point may be defined as a function of the depth of an object of interest.

Figure 7:
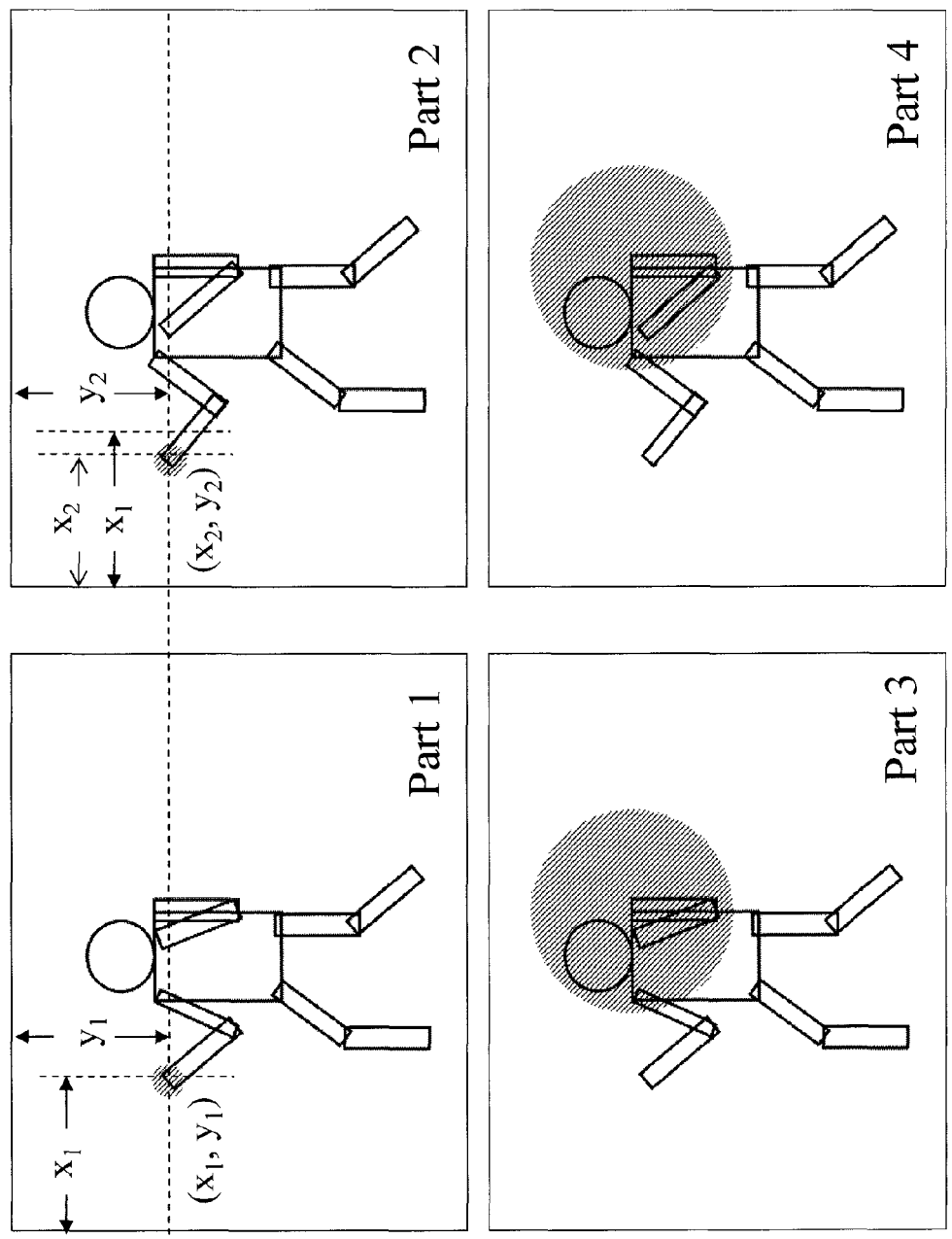
FIG. 7 is a set of schematic diagrams illustrating a pair of disparity images associated with a feature point.

In a computer vision system with two cameras to simulate human visual experience, the depth of an object is of an inverse proportion to the horizontal distance between the object in the first image from the first camera and the second image from the second camera, given the two cameras held at substantially the same elevation. Such horizontal distance may be calculated by identifying a pair of "disparity images". FIG. 7 is a set of schematic diagrams illustrating a pair of disparity images associated with a feature point. Referring to FIG. 7, part 1 and part 3 are images of an object from the first camera 12-1, and part 2 and part 4 are images of the object from the second camera 12-2. The horizontal distance of the right palm of the object between the first and second images is $|x_1-x_2|$, wherein $x_1$ is the x coordinate of the right palm in part 1, $x_2$ is the x coordinate of the right palm in part 2. In the present example, part 1 and part 2 form a pair of disparity images associated with the right palm. Moreover, $y_1$ is deemed to be equal to $y_2$ because the two cameras are disposed at the same elevation. Accordingly, the depth of a feature point associated with the right palm may be a function of $1/|x1-x2|$.

Figure 8:
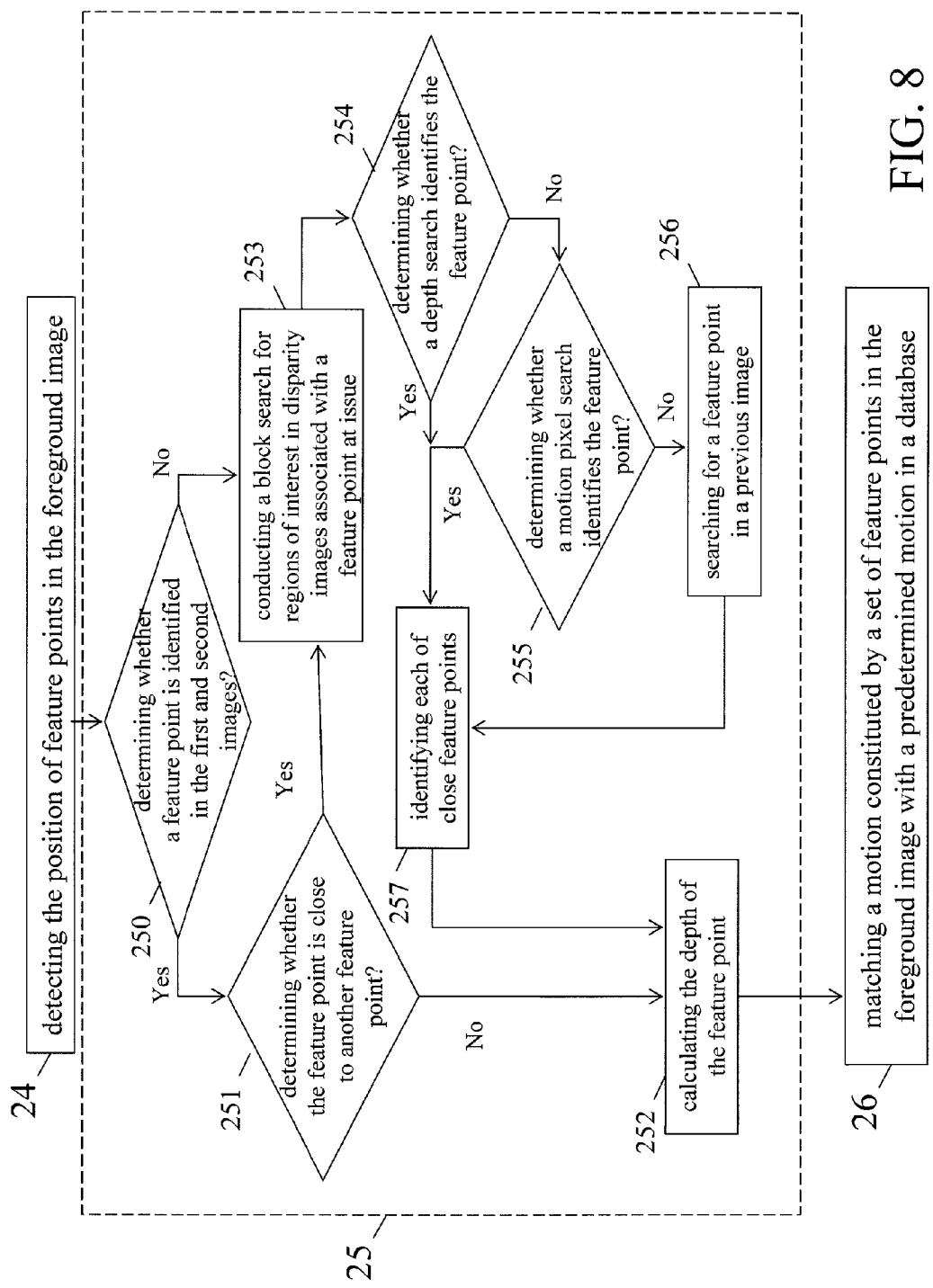
FIG. 8 is a flow diagram illustrating a method of calculating the depth of a feature point in accordance with an example of the present invention.

In contrast to the right palm that can be easily detected, however, the left palm in part 3 and part 4 overlaps the trunk and thus may be difficult to detect. In such a case, the feature point and the previous position of the left palm may be kept. FIG. 8 is a flow diagram illustrating a method of calculating the depth of a feature point in accordance with an example of the present invention. Referring to FIG. 8, at step 250, it is determined whether a feature point is identified in the first and second images. If confirmative, at step 251, it is determined whether the position of the feature point is close to that of another feature point identified in the first and second images at step 24. For example, the feature point $P_4$ may be close to $P_2$ or $P_6$. Moreover, the feature point $P_5$ may be close to $P_3$ or $P_7$. Close feature points may result from a non T-pose posture that an object may cross his arms ahead or put his hands on the waist, which may result in mistaking one feature point for another, for example, $P_4$ for $P_5$ or vice versa. Close feature points may be identified if the distance thereof is smaller than a threshold.

Figure 8A:
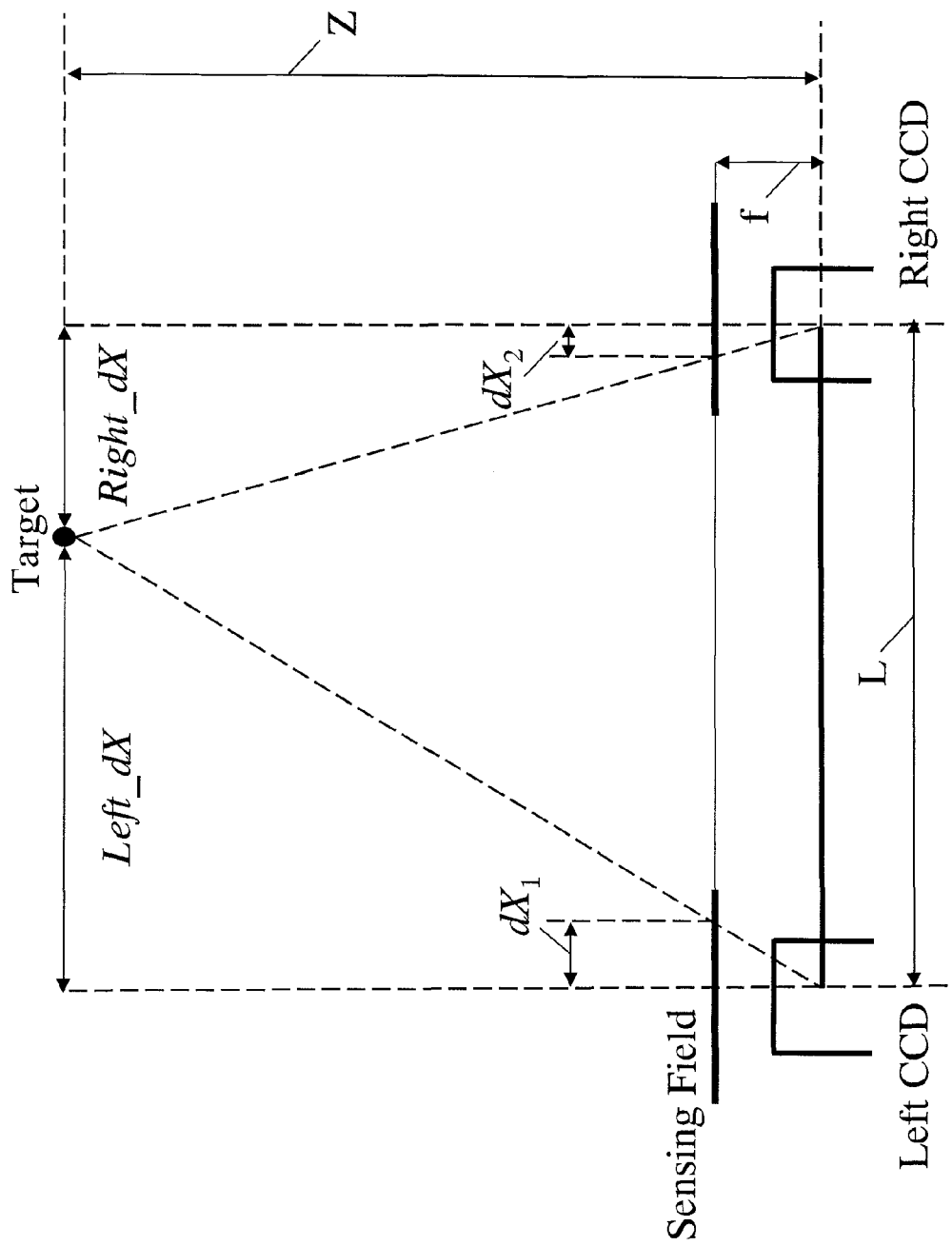
FIG. 8A is a diagram illustrating an exemplary method of calculating the depth of a feature point.

If at step 251 no other feature points are close to the feature point at issue, then at step 252 the depth of the feature point may be calculated. As previously discussed, the depth of a feature point may be inversely proportional to the distance of the object in disparity images. Referring to FIG. 8A, in one example according to the present invention, the depth of the feature point may be calculated by an equation below:

$$Z = \frac{L \times f}{dx}, \qquad (8)$$

where Z is the depth, f is the focal length, L is the center-to-center distance between two cameras, and dx is the distance of the object in disparity images. For example, in FIG. 8A, dx may be calculated by adding $dx_1$ and $dx_2$.

Referring back to FIG. 8, if at step 251 at least another feature point is close to the feature point at issue, or if at step 250 a desired feature point is not identified, at step 253, a block search may be conducted to identify regions of interest in disparity images associated with the feature point at issue. For example, it may be assumed that the feature point $P_5$ associated with the left palm is located inside the area of an overlapped portion such as the trunk or head. In the block search, each pixel of the overlapped portion such as the trunk in the first image may be scanned by a pixel block (having a size of 3×3, 5×5 or 7×7 pixels, for example) for a matched block in the second image. In one example, based on gray-scale level, the similarity of areas in the trunk of the first image may be calculated by "Sum of Absolute Differences" (SAD) or "Sum of Squared Difference" (SSD). If there is no matched block, other searching algorithms known in the art may be employed, which may include Full Search, Diamond Search or Hexagon-based Search. To facilitate the calculation, the search may be applied to odd (or even) pixels in a horizontal line or vertical line.

After the regions of interest in the disparity images associated with the feature point at issue are identified at step 253, a depth search may be conducted at step 254 in the regions of interest. If there are, for example, a number of "N" pixels in the trunk in the first image, the depth of each of the N pixels may be calculated based on the above equation (8). In one example, the top five percent of pixels with the smallest depth may be identified and recognized as the palms, like pixel blocks 85 and 86 illustrated in FIG. 8B. A known method based on histogram accumulation may be used to determine the top five percent of pixels.

Next, the pixels in the pixel blocks 85 and 86 may be compared in depth with $P_1$ associated with the head portion. Pixels with a depth greater than that of $P_1$ may be eliminated, thereby reducing the size of the blocks 85 and 86. The remaining pixels are the candidates for $P_4$ and $P_5$. If the feature point at issue is identified by the depth search at step 254, the depth of the feature point may thus be identified and each of the close feature points, if any, may be identified at step 257. If not, or in case the candidate pixels do not block together or the block 85 or 86 is relatively small, which may mean that the feature point at issue is close to another feature point, referring back to FIG. 8, a motion pixel search may be conducted at step 255.

Figure 8C:
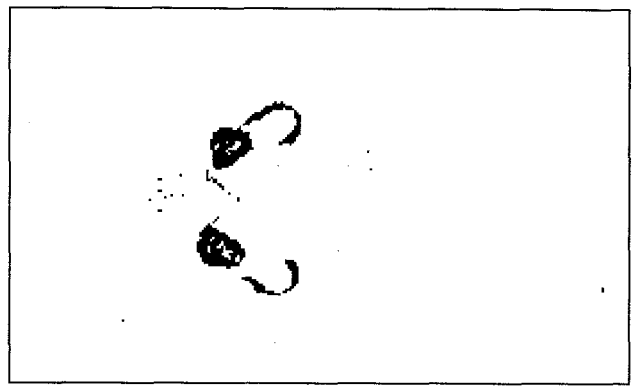
FIGS. 8B and 8C are diagrams of close feature points.
Figure 8B:
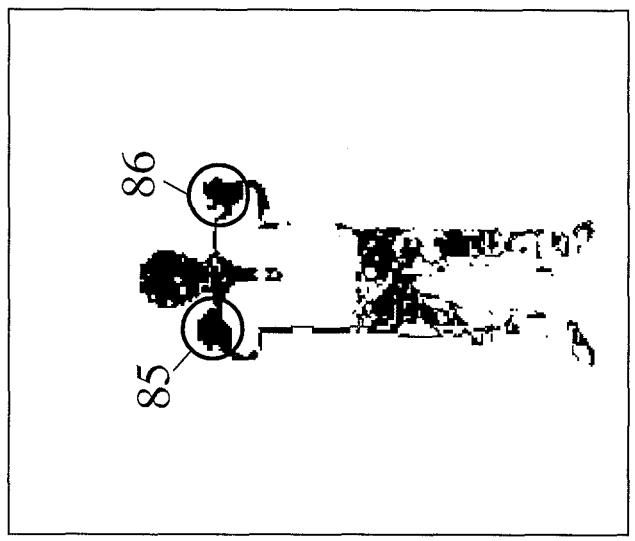

In a motion pixel search, an image of motion pixels, like one illustrated in FIG. 8C, may be obtained by comparing the current foreground image with a previous foreground image. Next, a search may be conducted in an area of a predetermined size in the image of motion pixels, wherein the area corresponds to an area in the previous foreground image where a feature point (such as $P_4$) similar to the feature point at issue has been identified. If the number of motion pixels within the area is greater than a threshold, then a pixel in the motion pixels within the area that is most similar to the previously identified feature point at issue may be identified and recognized as the feature point in the current foreground image.

If the feature point at issue is identified by the motion pixel search at step 255, each of the close feature points, if any, may be identified at step 257 and the depth of the feature point may be calculated at step 252. If not, a previous image search may be conducted at step 256. Specifically, a search for the feature point at issue in the current image is conducted by searching an area that corresponds to an area in a previous image where a similar feature point (such as $P_4$) is located. Furthermore, the previous image search may be conducted by using, for example, an m×n block such as 3×3, 5×5 or 7×7 block. The search may find candidates for the feature point at issue. Next, the position of the feature point at issue may be determined by identifying one of the candidates with the smallest depth value. For example, if $(x_3, y_3)$ is the undetermined position of the feature point in part 3 and $(x_4, y_4)$ is the undetermined position of the feature point in part 4. The search may find candidate pixels at $(x_{31}, y_{31})$, $(x_{32}, y_{32})$ and $(x_{33}, y_{33})$ in part 3, and candidate pixels at $(x_{41}, y_{41})$ and $(x_{42}, y_{42})$. In one example according to the present invention, the feature points at issue in part 3 and part 4 may then be identified by the maximum value of $|(x_{3i}, y_{3i}) - (x_{4j}, y_{4j})|$, where i=1 to 3 and j=1 to 2 in the present example.

Each of the close feature points, if any, may be identified at step 257. As previously discussed, feature points may be close to each other due to, for example, a posture with arms across or hands on the waist. For the purpose of illustration, feature points identified by the non T-pose segmentation are denoted as $P_{4S}$, $P_{5S}$, $P_{6S}$ and $P_{7S}$, while feature points identified by the depth search are denoted as $P_{4D}$, $P_{5D}$, $P_{6D}$ and $P_{7D}$. In one example, if the distance between $P_{4S}$ and $P_2$ (or between $P_{5S}$ and $P_3$) is smaller than a predetermined threshold $T_1$ and the distance between $P_{4S}$ and $P_{6S}$ (or between $P_{5S}$ and $P_{7S}$) is smaller than a predetermined threshold $T_2$, it may be determined that the object of interest hangs his arms down beside the trunk. Accordingly, based on the relative position of hands and waist, the feature points $P_4$ and $P_6$ (or $P_5$ and $P_7$) may be identified.

In another example, when $P_{4S}$ is lower than $P_2$ (or $P_{5S}$ is lower than $P_3$), if the 2D distance between $P_{4S}$ and $P_2$ (or $P_{5S}$ and $P_3$) is smaller than a threshold $T_3$, and if the 2D distance between $P_{4D}$ and $P_2$ (or between $P_{5D}$ and $P_3$) is smaller than a threshold $T_4$, then one of $P_{4S}$ and $P_{4D}$ (or $P_{5S}$ and $P_{5D}$) that is closer to a previously identified $P_4$ (or $P_5$) may be recognized as the feature point $P_4$ (or $P_5$) for the current image.

In still another example, when $P_{4S}$ is higher than $P_2$ (or $P_{5S}$ is higher than $P_3$), if the 2D distance between $P_{4S}$ and $P_2$ (or $P_{5S}$ and $P_3$) is greater than a threshold $T_5$, then $P_{4S}$ (or $P_{5S}$) may be recognized as $P_4$ (or $P_5$).

In computing disparity images, a method of Block-Matching may be used to determine the relationship of feature points in the first and second images. For areas of simple or uniform texture, however, the block matching method may sometimes produce undesirable results. To facilitate calculation, before applying the method, areas of simple texture may be identified. To search for simple texture areas, where the variance of pixels is small, the local variance of an area may be calculated as follows:

$$\delta^2(i,j) = \frac{1}{W^2} \sum_{k=i-M}^{i+M} \sum_{l=j-M}^{j+M} [I(k,l) - \mu(i,j)]^2, \qquad (9)$$

where $I(i,j)$ is the intensity of pixel $(i,j)$, W is the size of the pixel block, $M=(W-1)/2$, and $\mu(i,j)$ is the average intensity of pixels in an area under the pixel block, which is defined below:

$$\mu(i,j) = \frac{1}{W} \sum_{k=i-M}^{i+M} \sum_{l=j-M}^{j+M} I(k,l), \qquad (10)$$

For efficiency, the calculation of the variance is further revised to:

$$\sigma^2(i,j) = \frac{1}{W^2} \left\{ \sum_{k=i-M}^{i+M} \sum_{l=j-M}^{j+M} I^2(k,l) - \frac{1}{W^2} \left[ \sum_{k=i-M}^{i+M} \sum_{l=j-M}^{j+M} I(k,l) \right]^2 \right\} \qquad (11)$$

Figure 9A:
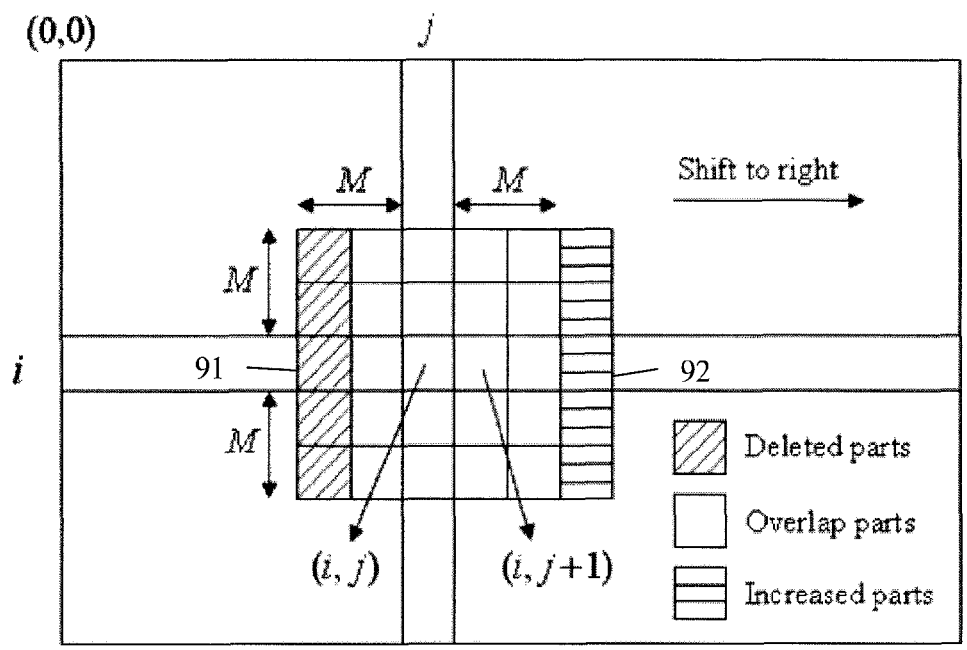
FIGS. 9A and 9B are diagrams illustrating an exemplary method of determining simple-texture area in an image.
Figure 9B:
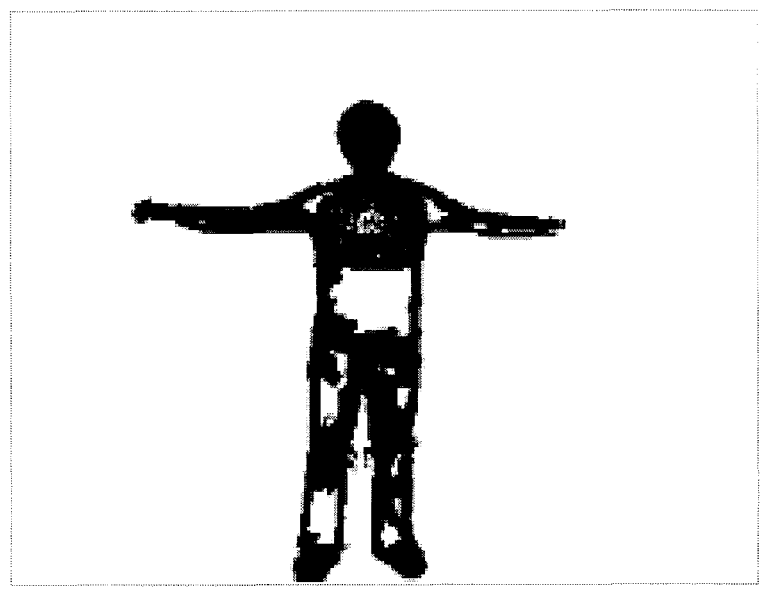

The loading of such calculation is still high. To simplify the calculation, an algorithm developed by Kenong Wu may be used. FIGS. 9A and 9B are diagrams illustrating an exemplary method of determining simple-texture area in an image. Referring to FIG. 9A, Wu's algorithm depends on a known variance $\sigma^2(i,j)$, and by shifting a mask of a predetermined size rightward, $\sigma^2(i,j+1)$ may be calculated by deleting a first amount of parts in an outgoing area 91 and adding a second amount of parts in an incoming area 92. Simple-texture areas identified may then be removed, resulting in an image as illustrated in FIG. 9B.

To facilitate the match in motion between an object of interest and a virtual role, a database of motions is established. FIG. 10A is a schematic diagram of a motion model in accordance with an example of the present invention. Referring to FIG. 10A, in addition to feature points $P_1$ to $P_9$, for more smooth motion rendering, the motion model may further include feature points $P_{10}$ and $P_{11}$ associated with elbows and $P_{12}$ and $P_{13}$ associated with knees. Furthermore, a vector formed by the positions of two of the feature points $P_1$ to $P_{13}$ may represent a meaningful motion. In building the database, meaningful vectors are normalized by equations below:

A vector formed by the relative positions of two feature points at $(x_1, y_1, z_1)$ and $(x_0, y_0, z_0)$ is defined as: $(x, y, z)=(x_1-x_0, y_1-y_0, z_1-z_0)$ $$\text{Length of the vector: } L_{length}=\sqrt{x^2+y^2+z^2} \qquad (12)$$

Vector normalization:

$$(X, Y, Z) = \left(\frac{x}{L_{lenght}}, \frac{y}{L_{lenght}}, \frac{z}{L_{lenght}}\right) \qquad (13)$$

Figure 10B:
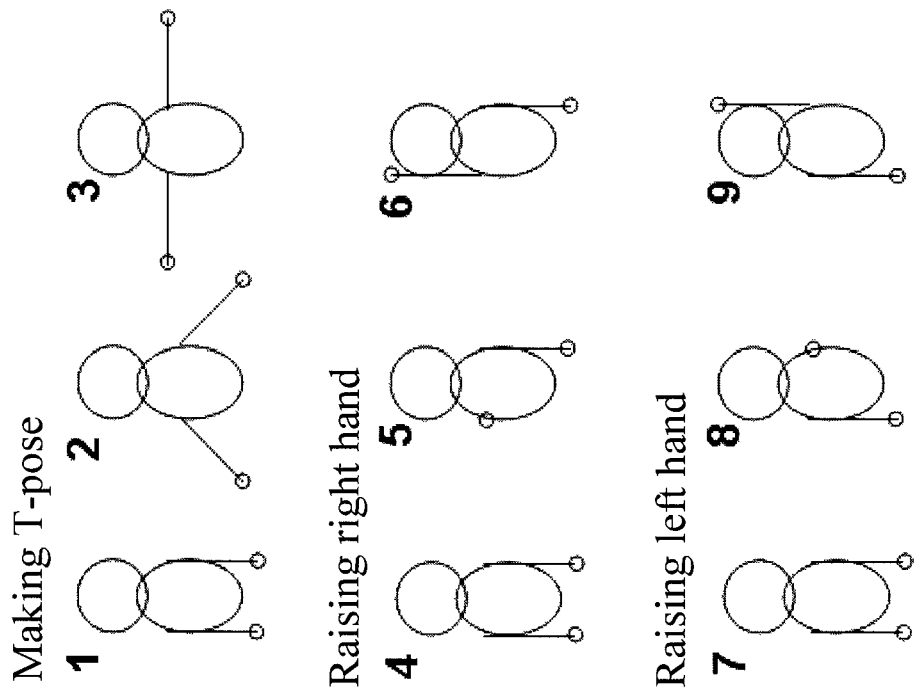
FIG. 10B is a set of diagrams illustrating exemplary motions.
Figure 10A:
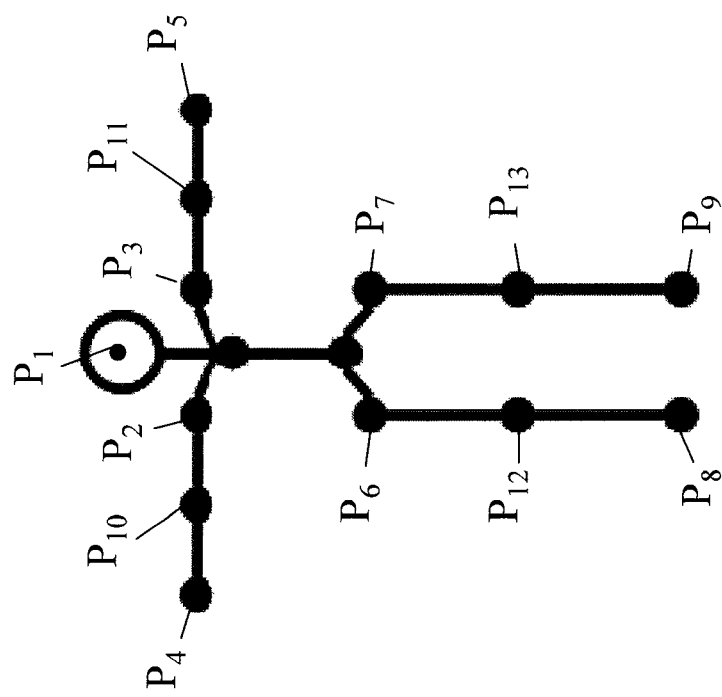
FIG. 10A is a schematic diagram of a motion model in accordance with an example of the present invention.

FIG. 10B illustrates exemplary sets of motion. Referring to FIG. 10B, a motion "making T-pose" may be formed by postures 1, 2 and 3. Posture 1 may be represented by a first vector set $(D_{11}, D_{21})$, where $D_{11}$ is a normalized vector formed by the position of $P_4$ relative to, for example, $P_2$, and $D_{21}$ is a normalized vector formed by the position of $P_5$ relative to, for example, $P_3$. Similarly, posture 2 may be represented by a second vector set $(D_{12}, D_{22})$ and posture 3 may be represented by a third vector set $(D_{13}, D_{23})$. Accordingly, the motion "making T-pose" may be represented by three vector sets. Exemplary vector coordinates of the vectors $D_{11}$ to $D_{33}$ are given below.

$D_{11}=(0,-1,0), D_{21}=(0,-1,0)$ $D_{12}=(-0.71,-0.71,0), D_{22}=(0.71,-0.71,0)$ $D_{13}=(-1,0,0), D_{23}=(1,0,0)$

Likewise, a motion "raising right hand" may be formed by postures 1, 5 and 6. Posture 5 may be represented by a vector set $(D_{15}, D_{21})$ and posture 6 may be represented by another vector set $(D_{16}, D_{21})$. Accordingly, the motion "raising right hand" may be represented by three vector sets. Exemplary vector coordinates of the vectors are given below.

$D_{11}=(0,-1,0), D_{21}=(0,-1,0)$ $D_{15}=(0,-0.6,0.8), D_{21}=(0,-1,0)$ $D_{16}=(0,1,0), D_{21}=(0,-1,0)$

Moreover, a motion "raising left hand" may be formed by postures 1, 8 and 9. Posture 8 may be represented by a vector set $(D_{11}, D_{28})$ and posture 9 may be represented by another vector set $(D_{11}, D_{29})$. Accordingly, the motion "raising left hand" may be represented by three vector sets. Exemplary vector coordinates of the vectors are given below.

$D_{11}=(0,-1,0), D_{21}=(0,-1,0)$ $D_{11}=(0,-1,0), D_{28}=(0,-0.6,0.8)$ $D_{11}=(0,-1,0), D_{21}=(0,1,0)$

Figure 10D:
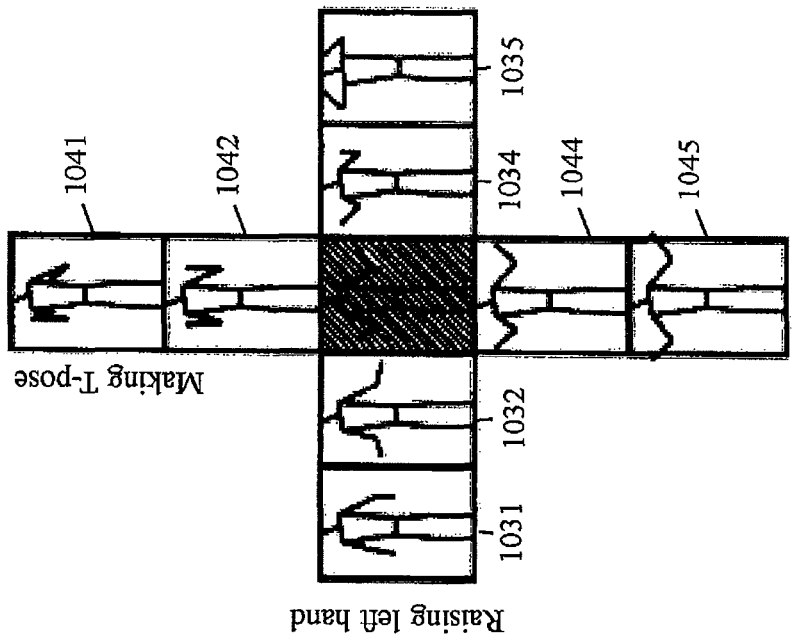
FIGS. 10C and 10D are diagrams illustrating a method of determining similar motions in accordance with an example of the present invention.
Figure 10C:
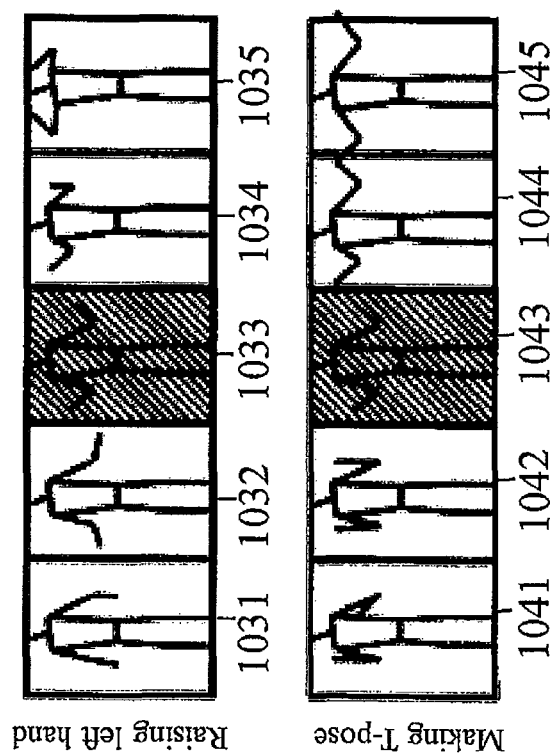

After vectors each associated with a predetermined posture and vector sets each associated with a predetermined motion are identified, similar motions may be identified so as to facilitate the control of a virtual role. FIGS. 10C and 10D are diagrams illustrating a method of determining similar motions in accordance with an example of the present invention. Referring to FIG. 10C, in a database, the motion "raising left hand" may be composed of a series of postures 1033 to 1035, and the motion "making T-pose" may be composed of a series of postures 1041 to 1045. As previously discussed, each of the postures may be represented by a vector set. A comparison of the two motions reveals that postures 1033 and 1043 are similar to each other, as illustrated in FIG. 10D. Similarity of postures in different motions may help smoothing the virtual role control. If two postures are similar, their corresponding normalized vectors are also similar. In one example according to the present invention, similarity of the postures may be determined by calculating a dot product of the vectors associated with the postures. In mathematics, the dot product of vectors $(v_x, v_y, v_z)$ and $(w_x, w_y, w_z)$ is calculated as follows:

$$V*W=v_x\cdot w_x+v_y\cdot w_y+v_z\cdot w_z \qquad (15)$$

Moreover, since a camera may capture, for example, thirty frames per second, each of the postures may be composed of a series of continuous frames. From the viewpoint of photography, similar postures may be composed of continuous frames with small variances. In one example, a series of indexes associated with a series of frames may be assigned to each of similar postures. For example, a series of indexes numbered 1 to 20 may represent the posture 1033 illustrated in FIG. 10C and a series of indexes numbered 51 to 71 may represent the posture 1043 illustrated in FIG. 10C.

Furthermore, after two postures with their feature points are identified in the database, a "smooth function" may be used to represent the degree of smoothness thereof. The higher degree in similarity, the more smooth the motion by continuous intermediate postures of a virtual role and in turn the more realistic a virtual role to act as an object of interest. In an example according to the present invention, a function "Smooth (P, Q)" may represent the smoothness of two postures P and Q. Moreover, Smooth (P, Q) may have a value equal to "0" if P and Q are similar to each other, and a positive value if P and Q are different from each other. For example, Smooth (P, P)=0, Smooth (P, P+1)=1, Smooth (posture 1031, posture 1033)=2, Smooth (posture 1033, posture 1043)=0 and Smooth (posture 1041, posture 1034)=3.

A matched posture may then be calculated by:

$$S_i=\alpha A_i+\beta B_i, \text{ where } \alpha,\beta\epsilon[0,1] \qquad (16)$$

where Si represents a candidate of similarity between a posture from the first or second image and a posture selected from the database; Ai represents the similarity between the posture from the first or second image and a potential posture selected from the database; Bi represents a posture determined by the Smooth function where the potential frame index of a posture and the start or end frame index of similar postures is closest to an input posture.

Figure 11:
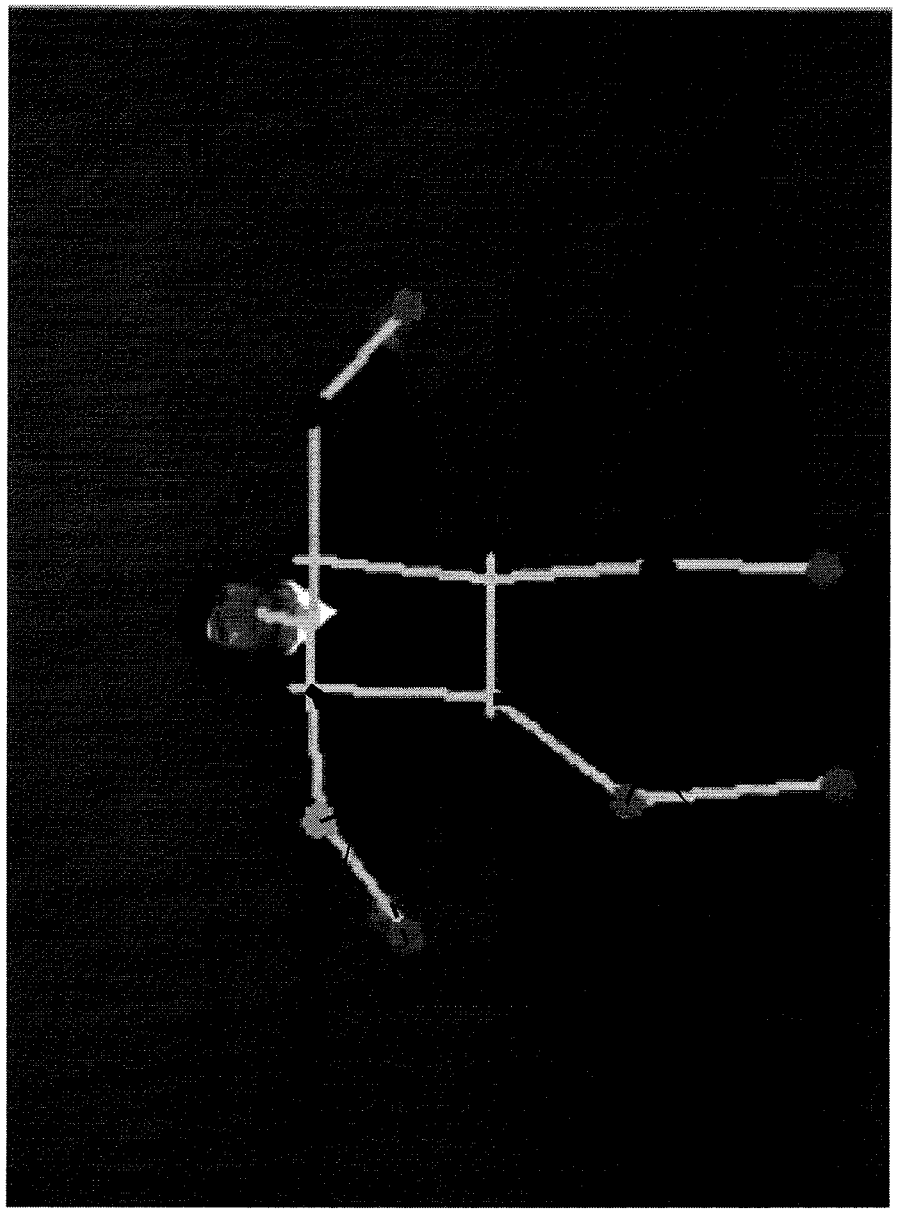
FIG. 11 is a diagram illustrating a method of identifying additional feature points in accordance with an example of the present invention.

Compared to other feature points, it may be difficult to detect feature points associated with knees and elbows. After the posture of a virtual role is matched, feature points associated with the knees and elbows of the virtual role may be fed back so as to identify the knees and elbows of an object of interest. FIG. 11 is a diagram illustrating a method of identifying additional feature points in accordance with an example of the present invention. Referring to FIG. 11, the feature points $VP_{10}$ associated with the right elbow and $VP_{12}$ associated with the right knee of a virtual role may be fed back for a smooth rendering of the object motion. The method of identifying feature points $P_{10}$ associated with the right elbow and $P_{12}$ associated with the right knee of the object of interest may include averagely dividing the angle $\angle P_6P_2P_4$ into two equal angles by a line $L_{101}$ and dividing $\angle P_2VP_{10}P_4$ into two equal angles by a line $L_{102}$, searching for $P_{10}$ in a direction from $VP_{10}$ toward an intersection of $L_{101}$ and $L_{102}$, and recognizing a point that first reaches the foreground image in the direction as $P_{10}$.

Next, the method may further include averagely dividing the angle $\angle P_6VP_{12}P_8$ into two equal angles by a line $L_{103}$, extending the line $\overline{P_2P_6}$ to cross $L_{103}$, searching for $P_{12}$ in a direction from $VP_{12}$ toward an intersection of $L_{103}$ and line $P_2P_6$, and recognizing a point that first reaches the foreground image in the direction as $P_{12}$.

Figure 12A:
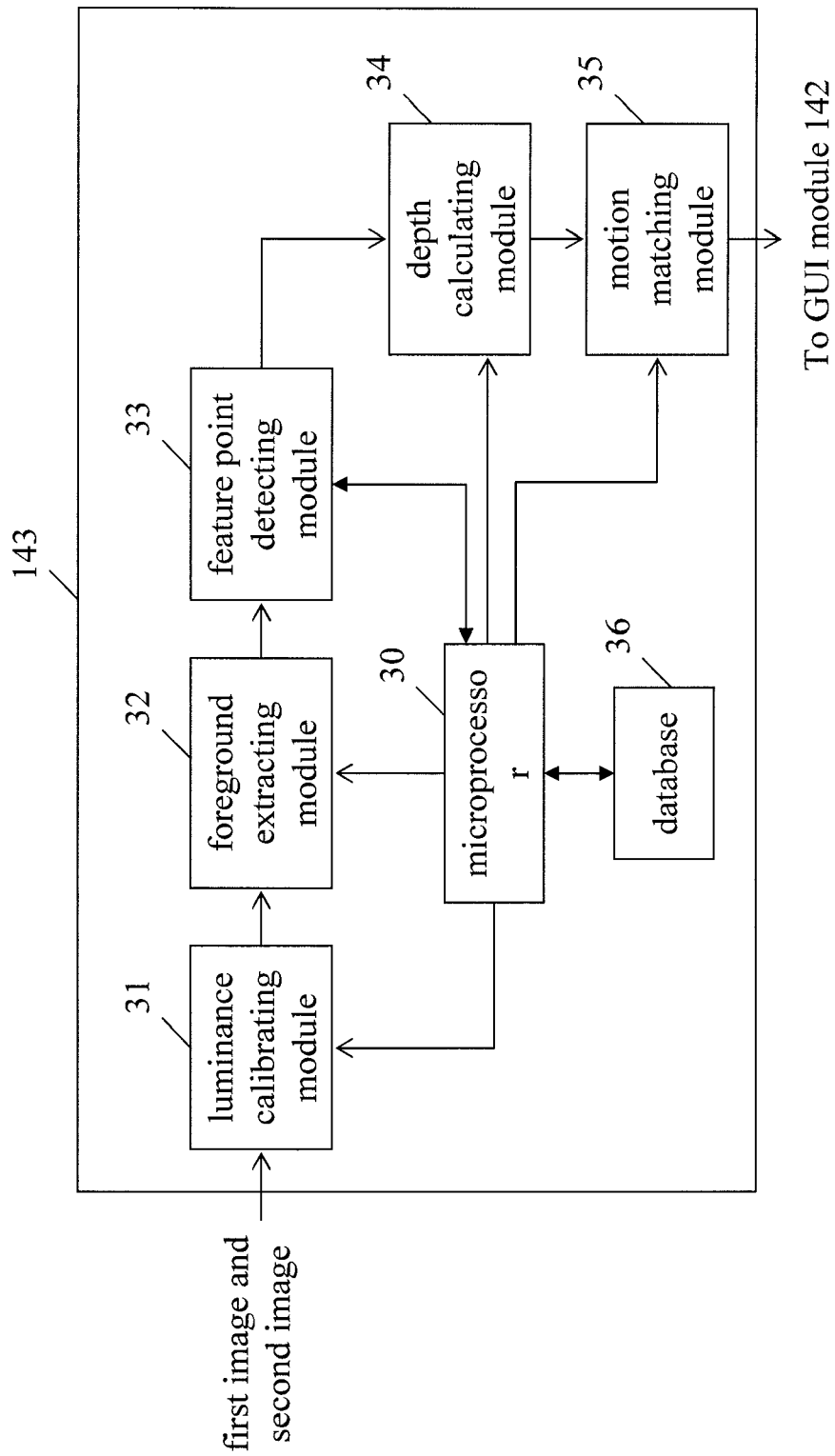
FIG. 12A is a block diagram of an image processing device in the system for motion detection illustrated in FIG. 1 in accordance with an example of the present invention.

FIG. 12A is a block diagram of the image processing device 143 in the system 10 for motion detection illustrated in FIG. 1 in accordance with an example of the present invention. Referring to FIG. 12A, also referring to FIG. 2A, the image processing device 143 may include a luminance calibrating module 31, a foreground extracting module 32, a feature point detecting module 33, a depth calculating module 34 and a motion matching module 35. Furthermore, the image processing device 143 may include a microprocessor 30 to control and coordinate the operation of the modules 31 to 35, and a memory or database 36 to store data and software programs. The luminance calibrating module 31 may calibrate the grayscale of the first and second images respectively taken by the first and second cameras 12-1 and 12-2.

The foreground extracting module 32 may extract a foreground image from each of the first and second images by, for example, filtering the background image. The feature point detecting module 33 may detect the position, i.e., the coordinates (x, y), of each of feature points in the foreground image. The depth calculating module 34 may conduct a search for feature point(s), if any, not identified by the feature point detecting module 33 and calculate the depth, i.e., the z-coordinate, of each of the feature points based on disparity images associated with the each feature point. The motion matching module 35 may be configured to identify a match in the database 36 for a motion formed by a set of postures, each of which in turn may be formed by a set of vectors associated with the orientation (x, y, z) of the feature points.

Skilled persons in the art will understand that the luminance calibrating module 31, foreground extracting module 32, feature point detecting module 33, depth calculating module 34 and motion matching module 35 may be implemented in hardware or software, in which the former may be more advantageous in terms of operation speed while the latter may be more cost effective in terms of design complexity. Moreover, the image processing device 143 if implemented in hardware may take the form of an integrated chip in the computing device 14 and if implemented in software may include programmed codes installed in the computing device 14 illustrated in FIG. 1.

Figure 12B:
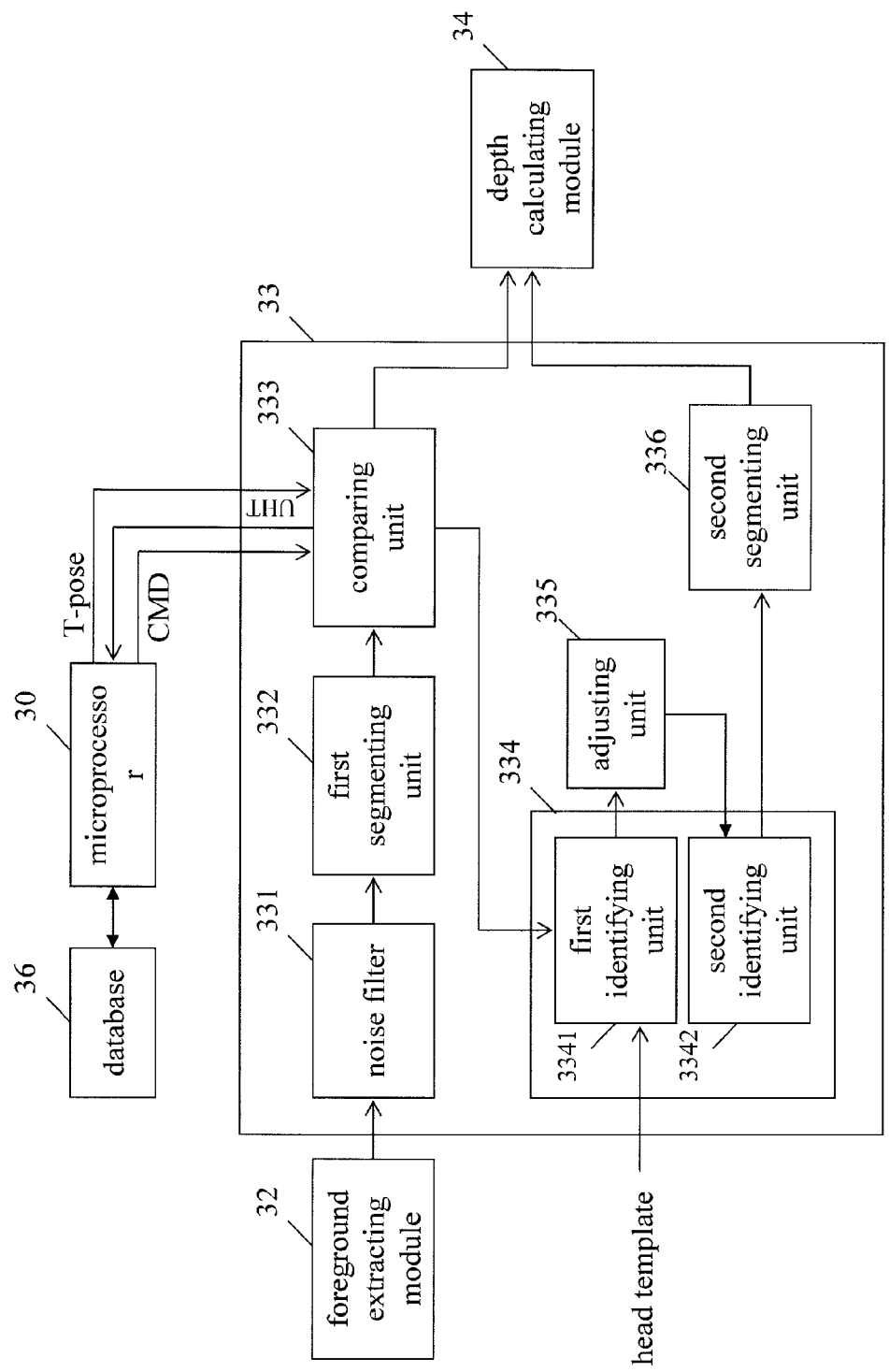
FIG. 12B is a block diagram of a feature point detecting module in the image processing device illustrated in FIG. 12A in accordance with an example of the present invention.

FIG. 12B is a block diagram of the feature point detecting module 33 in the image processing device 143 illustrated in FIG. 12A in accordance with an example of the present invention. Referring to FIG. 12B, also referring to FIG. 4, the feature point detecting module 33 may include a first segmenting unit 332, a comparing unit 333, a feature point identifying unit 334 and a second segmenting unit 336, and may optionally include a noise filter 331 and an adjusting unit 335.

The noise filter 331 may filter noise in the foreground image by, for example, a labeling method. The first segmenting unit 332 may, based on the assumption that the foreground image includes a T-pose object, segment the assumed T-pose object into a first set of sections such as several rectangular boxes and identify a first set of feature points of interest associated with the first set of sections. The comparing unit 333 may be configured to, based on the relative position, compare the first set of feature points of the assumed T-pose object with a set of predetermined feature points of a T-pose object obtained from the database 36. The obtained T-pose object is similar to the assumed T-pose object in the type of build. In response to a comparison result from the comparing unit 333, the microprocessor 30 may issue a command signal "CMD" to allow the first set of feature points identified by the first segmenting unit 332 to be processed in the depth calculating module 34 if the assumed T-pose object is indeed a T-pose object, and to reject the first set of feature points identified by the first segmenting unit 332 while initiate another search for feature points if the assumed T-pose object is not a T-pose object. In the case that the assumed T-pose object is indeed a T-pose object, a head portion of the T-pose object may be fed back to serve as an updated head template "UHT".

The feature point identifying unit 334 may further include a first identifying unit 3341 and a second identifying unit 3342. The first identifying unit 3341 may, based on a head template from the database 36, identify a head portion of the non T-pose object and the feature point $P_1$ associated with the head portion. The second identifying unit 3342 may identify a trunk portion and a shoulder of the non T-pose object based on the obtained T-pose object. In the present example, the adjusting unit 335 may adjust the obtained T-pose object in size to facilitate the identification of a trunk portion and a shoulder portion of the non T-pose object in the second identifying unit 3342. Moreover, the second identifying unit 3342 may identify the feature points $P_6$ and $P_7$ associated with the trunk portion and the feature points $P_2$ and $P_3$ associated with the shoulder portion, and thereby identify a new trunk portion defined by the feature points $P_2$, $P_3$, $P_6$ and $P_7$. The second segmenting unit 336 may segment the non T-pose image into a second set of sections based on the new trunk portion to facilitate the search for the remaining feature points.

Figure 12C:
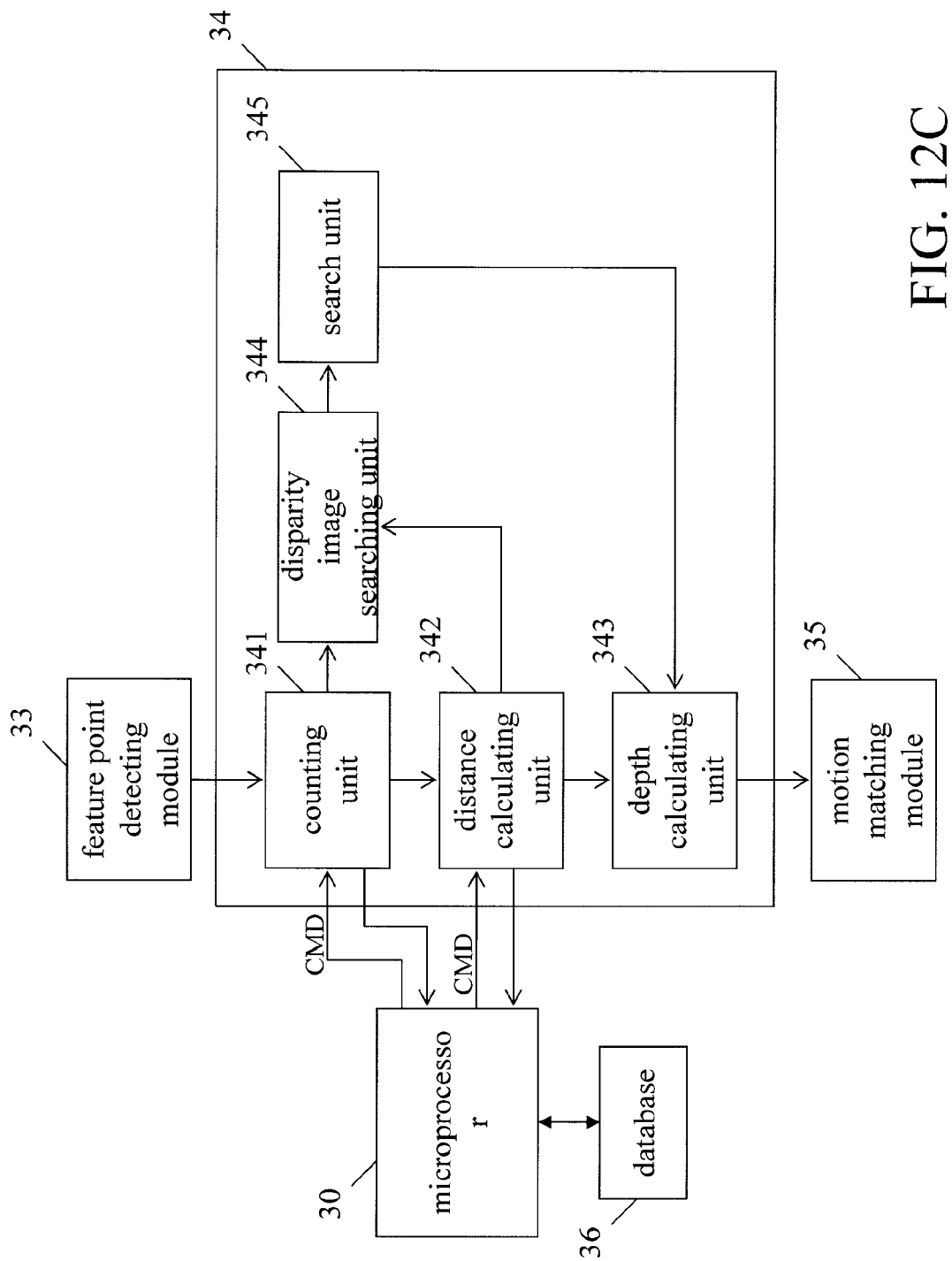
FIG. 12C is a block diagram of a depth calculating module in the image processing device illustrated in FIG. 12A in accordance with an example of the present invention.

FIG. 12C is a block diagram of the depth calculating module 34 in the image processing device 143 illustrated in FIG. 12A in accordance with an example of the present invention. Referring to FIG. 12C, also referring to FIG. 8, the depth calculating module 34 may include a counting unit 341, a distance calculating unit 342, a depth calculating unit 343, a disparity image searching unit 344 and a search unit 345.

The counting unit 341 may count the number of feature points identified by the feature point detecting module 33. If the number matches a predetermined value, for example, nine, the microprocessor 30 may cause the distance calculating unit 342 to calculate the distance between every two of the feature points. If, however, the number is not matched (which may mean that at least one feature point is not identified) or the distance between two of the feature points is smaller than a predetermined value (which may mean that the two feature points are too close), the disparity image searching unit 344 may, based on the foreground image each of the first and second images, conduct a search for disparity images associated with a missing or close feature point at issue.

The search unit 345 may be configured to conduct at least one of a depth search, a motion pixel search and a previous-image search for the feature point at issue, as previously discussed with reference to FIG. 8. After all of the predetermined number of feature points are identified by the search unit 345 or if no close feature points are found by the distance calculating unit 342, the depth calculating unit 343 may calculate the depth of each of the feature points. Consequently, the orientation, i.e., the coordinates (x, y, z), of each of the feature points is identified.

Figure 12D:
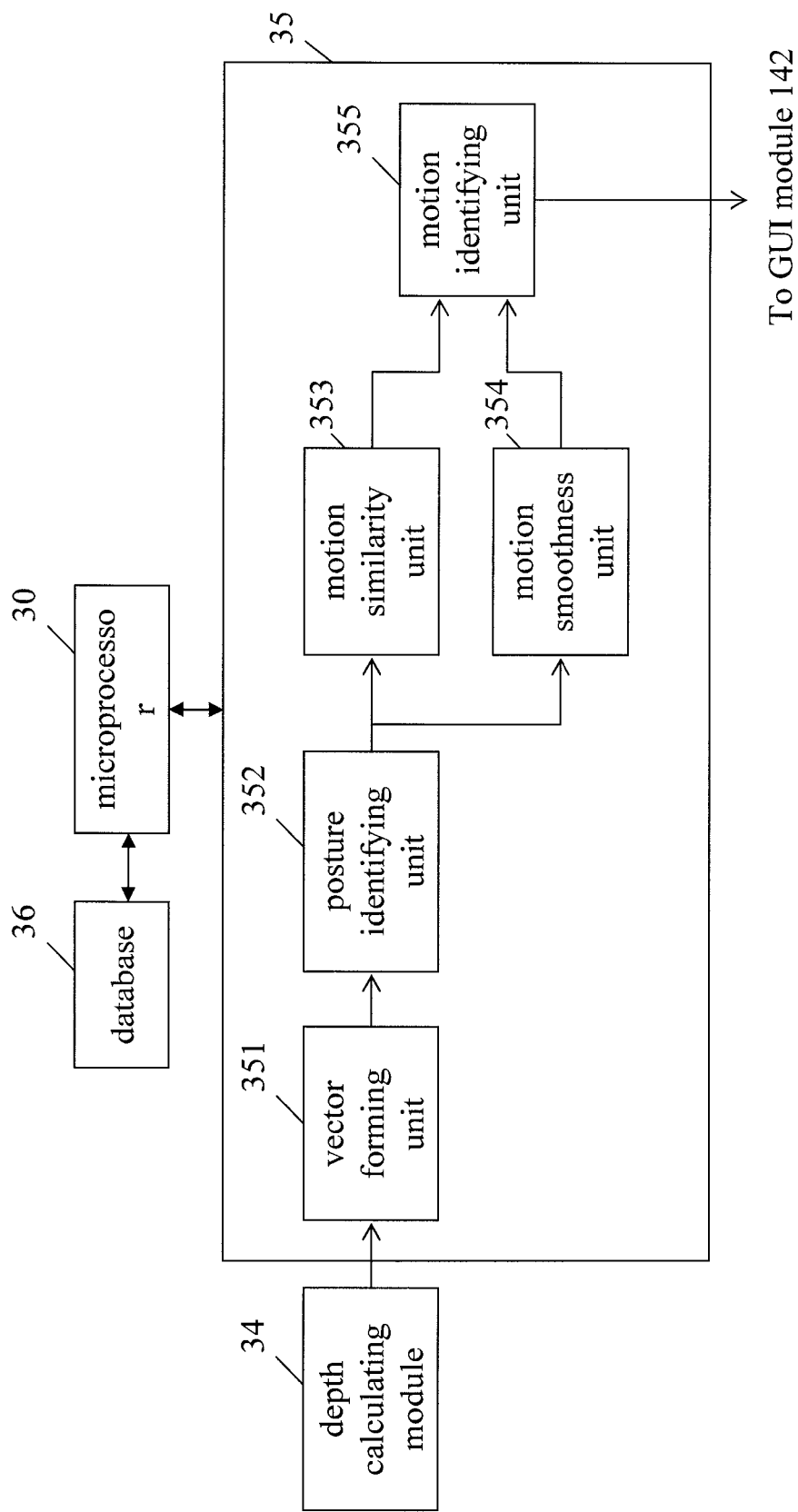
FIG. 12D is a block diagram of a motion matching module in the image processing device illustrated in FIG. 12A in accordance with an example of the present invention.

FIG. 12D is a block diagram of the motion matching module 35 in the image processing device 143 illustrated in FIG. 12A in accordance with an example of the present invention.

Referring to FIG. 12D, the motion matching module 35 may include a vector forming unit 351, a posture identifying unit 352, a motion similarity unit 353, a motion smoothness unit 354 and a motion identifying unit 355.

The vector forming unit 351 may, based on the relative position of two of the feature points, form a vector associated with the two feature points. Furthermore, the vector may be normalized to facilitate subsequent calculation. As previously discussed with reference to FIGS. 10A to 10D, a posture may be represented by a set of vectors and a motion may be represented by a set of postures. The posture identifying unit 352 may identify a posture of the foreground object based on a set of vectors. The motion similarity unit 353 may identify a set of postures in the database 36 which are most similar to the current set of postures. In one example, the motion similarity unit 353 may determine the degree of similarity between two postures by calculating a dot product of the vectors associated with each of the two postures. Moreover, the motion smoothness unit 354 may determine the degree of smoothness of two postures by calculating a smooth function. To perform the smooth function, a plurality of sets of continuous postures may be stored in the database 36. Each of the postures may include an index number assigned thereto in a manner that similar or same postures have the same index numbers and postures close to each other in terms of motion have close index numbers. Accordingly, a set of continuous index numbers may be assigned to a set of continuous postures. Based on the results from the motion similarity unit 353 and motion smoothness unit 354, the motion identifying unit 355 may identify a most likely motion in the database 36.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of detecting feature points of an object in a system for motion detection, the method comprising:
   obtaining a first image of the object from a first camera and a second image of the object from a second camera;
   extracting a foreground image from each of the first image and the second image;
   based on an assumption that the foreground image from each of the first image and the second image is a T-pose image, segmenting the foreground image from each of the first image and the second image into a first set of sections;
   identifying a first set of feature points associated with the first set of sections;
   obtaining a T-pose image with a set of predetermined feature points; and
   determining whether the assumed T-pose foreground image is a T-pose image by comparing the relative position of feature points associated with the assumed T-pose foreground image with the relative position of the set of predetermined feature points from the obtained T-pose image based on the spatial relationship of the feature points.

2. The method of claim 1, when it is determined that the assumed T-pose foreground image from each of the first image and the second image is not a T-pose image, further comprising:
   identifying a highest portion of the foreground image from each of the first image and the second image;
   providing a check box of a predetermined size; and
   determining whether the highest portion of the foreground image from each of the first image and the second image in the check box reaches a predetermined ratio.

3. The method of claim 2, when it is determined that the highest portion of the foreground image from each of the first image and the second image in the check box does not reach a predetermined ratio, further comprising:
   obtaining a head template.

4. The method of claim 3 further comprising:
   adjusting the size of the obtained T-pose image from each of the first image and the second image.

5. The method of claim 3 further comprising:
   identifying a trunk portion of the foreground image based on the obtained T-pose image from each of the first image and the second image; and
   identifying a shoulder portion of the foreground image from each of the first image and the second image based on the trunk portion.

6. The method of claim 5 further comprising:
   identifying feature points associated with the trunk portion and the shoulder portion; and
   forming vectors based on the feature points associated with the trunk portion and the shoulder portion.

7. The method of claim 6 further comprising:
   segmenting the foreground image from each of the first image and the second image into a second set of sections based on the vectors.

8. The method of claim 1 further comprising:
   determining whether a feature point is identified in the first and second images; and
   when it is determined that a feature point is not identified, conducting a search for regions of interest in disparity images associated with the feature point.

9. The method of claim 8 further comprising:
   determining whether a feature point is close to another feature point; and
   when it is determined that a feature point is close to another feature point, conducting a search for regions of interest in disparity images associated with the feature point.

10. The method of claim 9 further comprising:
    calculating the depth of each pixels in the regions of interest in the disparity images associated with the feature point.

11. The method of claim 10, wherein calculating the depth includes calculation in an equation below:

$$Z = \frac{L \times f}{dx},$$

where Z is the depth of the feature point, f is a focal length of each of the first and second cameras, L is the center-to-center distance between the first and second cameras, and dx is the distance of the object in disparity images.

12. The method of claim 10 further comprising:

identifying an image of motion pixels by comparing the foreground image from each of the first image and the second image with a previous foreground image from each of the first image and the second image; and conducting a search in an area of a predetermined size in the image of motion pixels, wherein the area corresponds to an area in the previous foreground image from each of the first image and the second image where a feature point similar to the feature point at issue has been identified.

13. The method of claim 10 further comprising:

conducting a search in an area of the foreground image from each of the first image and the second image that corresponds to an area in a previous image where a similar feature point is located.

14. A method of detecting feature points of an object in a system for motion detection, the method comprising:

obtaining an image of the object from a camera;

extracting a foreground image from the image;

based on an assumption that the foreground image is a T-pose image, segmenting the foreground image into a first set of sections;

identifying a first set of feature points associated with the first set of sections;

comparing the relative position of the first set of feature points associated with the assumed T-pose foreground image with the relative position of the set of predetermined feature points from an obtained T-pose image;

identifying a trunk portion and a shoulder portion in the foreground image;

segmenting the foreground image into a second set of sections based on the trunk portion and the shoulder portion; and identifying a second set of feature points associated with the second set of sections.

15. The method of claim 14, before identifying the trunk portion and the shoulder portion, further comprising:

obtaining a head template.

16. The method of claim 14 further comprising:

identifying feature points associated with the trunk portion and the shoulder portion; and forming vectors based on the feature points associated with the trunk portion and the shoulder portion.

17. The method of claim 16 further comprising:

segmenting the foreground image into a second set of sections based on the vectors.

18. The method of claim 14 further comprising:

determining whether a feature point is identified in the first and second images; and when it is determined that a feature point is not identified, conducting a search for regions of interest in disparity images associated with the feature point.

19. The method of claim 14 further comprising:

determining whether a feature point is close to another feature point; and when it is determined that a feature point is close to another feature point, conducting a search for regions of interest in disparity images associated with the feature point.

20. The method of claim 14 further comprising:

identifying an image of motion pixels by comparing the foreground image with a previous foreground image; and conducting a search in an area of a predetermined size in the image of motion pixels, wherein the area corresponds to an area in the previous foreground image where a feature point similar to the feature point at issue has been identified.

* * * * *